United States Patent
Fukuda et al.

(10) Patent No.: US 12,474,857 B2
(45) Date of Patent: Nov. 18, 2025

(54) MEMORY SYSTEM

(71) Applicant: Kioxia Corporation, Tokyo (JP)

(72) Inventors: Akifumi Fukuda, Yokohama Kanagawa (JP); Kenta Yasufuku, Yokohama Kanagawa (JP)

(73) Assignee: Kioxia Corporation, Tokyo (JP)

( * ) Notice: Subject to any disclaimer, the term of this patent is extended or adjusted under 35 U.S.C. 154(b) by 104 days.

(21) Appl. No.: 18/178,422

(22) Filed: Mar. 3, 2023

(65) Prior Publication Data

US 2023/0409229 A1 Dec. 21, 2023

(30) Foreign Application Priority Data

Jun. 21, 2022 (JP) ................................ 2022-099789

(51) Int. Cl.
*G06F 3/00* (2006.01)
*G06F 3/06* (2006.01)
*G06F 12/00* (2006.01)

(52) U.S. Cl.
CPC .......... *G06F 3/0653* (2013.01); *G06F 3/0656* (2013.01); *G06F 3/0658* (2013.01); *G06F 3/0679* (2013.01); *G06F 3/0604* (2013.01)

(58) Field of Classification Search
CPC .... G06F 3/0653; G06F 3/0656; G06F 3/0658; G06F 3/0679; G06F 3/0604
USPC ........................................................ 711/154
See application file for complete search history.

(56) References Cited

U.S. PATENT DOCUMENTS

| | | | | |
|---|---|---|---|---|
| 6,000,006 A | * | 12/1999 | Bruce | G06F 12/0246 |
| | | | | 714/E11.038 |
| 10,552,085 B1 | * | 2/2020 | Chen | G06F 3/061 |
| 10,929,028 B2 | * | 2/2021 | Kim | G06F 3/0659 |
| 10,990,537 B1 | * | 4/2021 | Moertl | G11C 29/4401 |
| 11,704,235 B2 | * | 7/2023 | Ochiai | G06F 12/0246 |
| | | | | 711/154 |
| 2007/0118688 A1 | * | 5/2007 | Lee | G06F 12/0868 |
| | | | | 711/E12.019 |
| 2007/0204128 A1 | * | 8/2007 | Lee | G06F 12/0246 |
| | | | | 365/185.11 |
| 2007/0294490 A1 | * | 12/2007 | Freitas | G06F 12/0246 |
| | | | | 711/154 |
| 2009/0128942 A1 | * | 5/2009 | Ermolov | G11B 9/1463 |
| | | | | 360/31 |

(Continued)

OTHER PUBLICATIONS

H. Nomura, et al. "Proposal of an Adaptive Stubborn Cache Management," IPSJ Transactions on Computing Systems, vol. 12, No. 3, Jul. 2019, pp. 76-86 (with English translation).

(Continued)

*Primary Examiner* — Sheng Jen Tsai
(74) *Attorney, Agent, or Firm* — Kim & Stewart LLP

(57) ABSTRACT

A memory system includes a non-volatile memory and a controller including a memory having a lower access latency than the non-volatile memory. The controller is configured to track addresses of data stored in the non-volatile memory that were subject to prior wear leveling processes, in a buffer configured in the memory of the controller, perform a current wear leveling process on data stored in the non-volatile memory, and determine whether an address of the data subject to the current wear leveling process is stored in the buffer, and perform a pinning process to disable overwrite of data stored in the memory of the controller and corresponding to the address.

18 Claims, 24 Drawing Sheets

(56) References Cited

U.S. PATENT DOCUMENTS

| | | | | |
|---|---|---|---|---|
| 2009/0157950 | A1* | 6/2009 | Selinger | G06F 12/08 |
| | | | | 711/E12.008 |
| 2010/0064111 | A1* | 3/2010 | Kunimatsu | G06F 12/0804 |
| | | | | 711/E12.001 |
| 2010/0205354 | A1* | 8/2010 | Suzuki | G06F 12/0246 |
| | | | | 711/E12.001 |
| 2011/0072199 | A1* | 3/2011 | Reiter | G06F 13/24 |
| | | | | 711/170 |
| 2011/0078402 | A1* | 3/2011 | Sato | G11C 16/349 |
| | | | | 711/E12.001 |
| 2011/0238897 | A1* | 9/2011 | Abe | G06F 11/3419 |
| | | | | 711/E12.008 |
| 2011/0271030 | A1* | 11/2011 | Iaculo | G06F 12/0246 |
| | | | | 711/E12.008 |
| 2012/0030405 | A1* | 2/2012 | Kunimatsu | G06F 12/0246 |
| | | | | 711/6 |
| 2012/0030409 | A1* | 2/2012 | Post | G06F 12/0246 |
| | | | | 711/E12.001 |
| 2012/0030428 | A1* | 2/2012 | Yasufuku | G06F 12/0893 |
| | | | | 711/E12.052 |
| 2012/0135710 | A1* | 5/2012 | Schell | H04W 4/60 |
| | | | | 455/410 |
| 2012/0290772 | A1* | 11/2012 | Asano | G06F 12/0246 |
| | | | | 711/E12.008 |
| 2012/0290781 | A1* | 11/2012 | Seo | G06F 12/0246 |
| | | | | 711/E12.001 |
| 2013/0080717 | A1* | 3/2013 | Uehara | G06F 12/0246 |
| | | | | 711/E12.001 |
| 2013/0124787 | A1* | 5/2013 | Schuette | G11C 16/0483 |
| | | | | 711/103 |
| 2013/0138870 | A1* | 5/2013 | Yoon | G06F 11/1072 |
| | | | | 711/E12.008 |
| 2013/0275657 | A1* | 10/2013 | Kim | G06F 12/0246 |
| | | | | 711/E12.008 |
| 2013/0346676 | A1* | 12/2013 | Kim | G06F 12/0246 |
| | | | | 711/103 |
| 2014/0052893 | A1* | 2/2014 | Zhang | G06F 12/0246 |
| | | | | 711/E12.008 |
| 2014/0195724 | A1* | 7/2014 | Shin | G06F 12/1408 |
| | | | | 711/202 |
| 2014/0237191 | A1* | 8/2014 | Dong | G06F 12/121 |
| | | | | 711/135 |
| 2015/0006795 | A1* | 1/2015 | Becker | G06F 12/0246 |
| | | | | 711/103 |
| 2015/0280742 | A1* | 10/2015 | Liu | H03M 13/1102 |
| | | | | 714/758 |
| 2016/0239383 | A1* | 8/2016 | Feng | G06F 12/0246 |
| 2016/0274802 | A1* | 9/2016 | Koo | G06F 3/0616 |
| 2016/0299688 | A1* | 10/2016 | Devendrappa | G06F 3/0659 |
| 2017/0031629 | A1* | 2/2017 | Nakamoto | G06F 12/0246 |
| 2017/0115901 | A1* | 4/2017 | Franke | G06F 3/0616 |
| 2017/0115902 | A1* | 4/2017 | Franke | G06F 11/16 |
| 2017/0115903 | A1* | 4/2017 | Franke | G06F 11/3034 |
| 2017/0199681 | A1* | 7/2017 | Jain | G06F 9/505 |
| 2017/0199769 | A1* | 7/2017 | Jain | G06F 11/008 |
| 2017/0199798 | A1* | 7/2017 | Jain | G06F 11/3024 |
| 2018/0039573 | A1* | 2/2018 | Shung | G06F 12/1009 |
| 2018/0157415 | A1* | 6/2018 | Choi | G06F 12/0246 |
| 2018/0321878 | A1* | 11/2018 | Hong | G06F 3/0616 |
| 2019/0018768 | A1* | 1/2019 | Kim | G06F 12/0868 |
| 2019/0095328 | A1* | 3/2019 | Naeimi | G06F 12/0897 |
| 2019/0102111 | A1* | 4/2019 | Shung | G06F 3/0616 |
| 2019/0303007 | A1* | 10/2019 | Hong | G06F 3/0655 |
| 2020/0104057 | A1* | 4/2020 | Kim | G06F 9/5016 |
| 2020/0159411 | A1* | 5/2020 | Mukaida | G06F 12/0646 |
| 2020/0272538 | A1 | 8/2020 | Manning et al. | |
| 2021/0374065 | A1* | 12/2021 | Wei | G06F 12/0891 |
| 2022/0066938 | A1* | 3/2022 | Kim | G06F 13/1673 |
| 2022/0164286 | A1* | 5/2022 | Jeong | G06F 12/0806 |
| 2022/0188034 | A1* | 6/2022 | Schuh | G06F 3/0659 |

OTHER PUBLICATIONS

H. Nomura, et al. ""Stubborn" Strategy to Mitigate Remaining Cache Misses," 2016 IEEE 34th International Conference on Computer Design (ICCD), 2016, pp. 388-391.

* cited by examiner

FIG. 4

| ENTRY NUMBER | DATA | TAG | Valid | ACCESS HISTORY |
|---|---|---|---|---|
| 0 | 100 | 1000 | 1 | 0011 |
| 1 | xxxx | xxxx | 0 | xxxx |
| 2 | 3 | 2201 | 1 | 1100 |
| 3 | xxxx | xxxx | 0 | xxxx |

| ENTRY NUMBER | DATA | TAG | Valid | ACCESS HISTORY | PIN FLAG |
|---|---|---|---|---|---|
| 0 | 100 | 1000 | 1 | 0011 | 0 |
| 1 | xxxx | xxxx | 0 | xxxx | x |
| 2 | 3 | 2201 | 1 | 1100 | 1 |
| 3 | xxxx | xxxx | 0 | xxxx | x | pin COUNTER | 1 |

| ENTRY NUMBER | DATA | TAG | Valid | ACCESS HISTORY |
|---|---|---|---|---|
| 0 | 100 | 1000 | 1 | 0011 |
| 1 | xxxx | xxxx | 0 | xxxx |
| Pin! ② | 3 | 2201 | 1 | 1100 |
| 3 | xxxx | xxxx | 0 | xxxx |

| ENTRY NUMBER | ENTRY NUMBER OF PIN COMPLETION OF TABLE IN FIG. 12 | valid |
|---|---|---|
| 0 | ② | 1 |
| 1 | x | 0 |

MEMORY SYSTEM

CROSS-REFERENCE TO RELATED APPLICATION

This application is based upon and claims the benefit of priority from Japanese Patent Application No. 2022-099789, filed Jun. 21, 2022, the entire contents of which are incorporated herein by reference.

FIELD

Embodiments described herein relate generally to a memory system with a non-volatile memory.

BACKGROUND

In recent years, memory systems with a non-volatile memory have become widespread. As such a memory system, for example, a solid state drive (SSD) including NAND flash memory is known.

BRIEF DESCRIPTION OF THE DRAWINGS

FIG. 4 is a diagram showing an example of a data structure of a buffer according to the first embodiment.

FIG. 11 is a diagram showing an example of a data structure of a buffer according to the second embodiment.

FIGS. 12 and 13 are diagrams showing another example of a data structure of the buffer according to the second embodiment.

DETAILED DESCRIPTION

Figure 1:
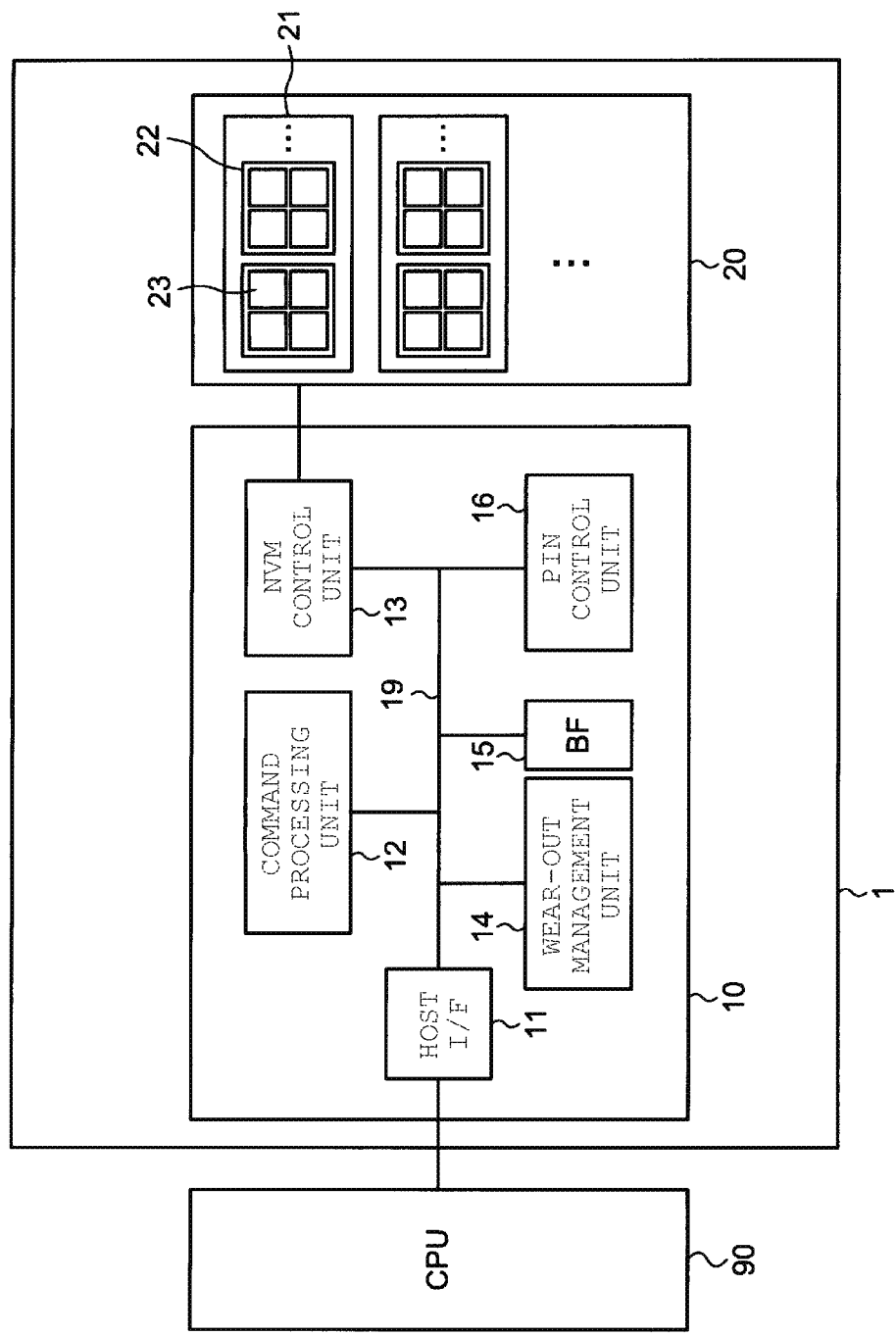
FIG. 1 is a block diagram showing an overall configuration of a memory system according to a first embodiment.

Embodiments provide a memory system capable of improving the processing speed while reducing cost increases.

In general, according to an embodiment, a memory system includes a non-volatile memory and a controller including a memory having a lower access latency than the non-volatile memory. The controller is configured to track addresses of data stored in the non-volatile memory that were subject to prior wear leveling processes, in a buffer configured in the memory of the controller, perform a current wear leveling process on data stored in the non-volatile memory, and determine whether an address of the data subject to the current wear leveling process is stored in the buffer, and perform a pinning process to disable overwrite of data stored in the memory of the controller and corresponding to the address.

Hereinafter, memory systems according to embodiments will be specifically described with reference to the drawings. In the following description, components having substantially the same functions and configurations are denoted by the same reference numerals, and the redundant description will be given only when necessary. Each embodiment shown below exemplifies a device and a method for embodying the technical idea of the embodiment. The technical idea of the embodiment is not limited to the material, shape, structure, arrangement, and the like of the components described below. The technical idea of the embodiment may add various changes to the claims.

The following embodiments may be combined with each other as long as there is no technical contradiction.

Although details will be described below, provided is a buffer (first buffer 15) for temporarily storing data to be written or read when a write operation or a read operation to and from the non-volatile memory (non-volatile memory 20) is performed. The buffer has a smaller capacity than the non-volatile memory but functions as a cache memory that allows high-speed data access (i.e., lower latency in access) to data stored in the non-volatile memory. The processing speed can be improved by storing frequently accessed data in a buffer and outputting data stored in the buffer as much as possible.

Since the capacity of the buffer is smaller than the capacity of the non-volatile memory, it is not possible for the buffer to store all the data stored in the non-volatile memory. Therefore, when new data is added when there is no free capacity of the buffer, it is necessary to evict the previously added data from the buffer (i.e., overwrite the data) based on predetermined conditions, and the evicted data is stored in the non-volatile memory. This operation is called "eviction". In the present embodiment, processing to temporarily fix such data in the buffer (pinning process) is performed so that data with a relatively high access frequency is not evicted. In the following description, when a pinning process is performed on certain data, other information corresponding to the entry number in which the data is stored is fixed in the buffer along with the data. In other words, a flag that invalidates the operation is set for the entry containing the data to be pinned.

The resistance to read and write operations of a non-volatile memory is finite. Therefore, as read and write operations are executed on a particular memory cell, the electrical characteristics of that memory cell deteriorate. The deterioration of the electrical characteristics of a memory cell increases the possibility of errors occurring in the information stored in the memory cell. In the following embodiments, the deterioration of electrical characteristics of memory cells provided in a non-volatile memory is referred to as "wear-out". The deterioration of the electrical characteristics of a memory cell depends on, for example, the number of write and read operations performed on the memory cell. Therefore, in this case, the number of times these operations are performed is referred to as "wear-out information". In the following embodiments, since write and read operations are performed in page units, the above terms of wear-out and wear-out information are used for pages.

The definition of "wear-out information" varies depending on the type of the non-volatile memory. For example, in the case of a non-volatile memory that wears out primarily from write operations, the number of times write operations have been performed for the target page can be the wear-out information. Meanwhile, in the case of a non-volatile memory that wears out primarily from read operations, the number of times read operations have been performed for the target page can be the wear-out information. For a non-volatile memory that wears out equally on both write and read operations, the number of times both write and read operations have been performed for the target page can be the wear-out information. For a non-volatile memory that wears out by erasing operations in addition to write and read operations, the number of times erasing operations in addition to the above write and read operations have been performed for the target page can be the wear-out information.

For example, when memory cells provided in a target page wear out by read and write operations on pages adjacent to the page, in addition to the number of times write and read operations are performed on the target page, the number of times write and read operations have been performed on the adjacent pages can be wear-out information.

In a non-volatile memory, there is a possibility that the memory cell provided in the target page will become incapable of storing data or the data stored in the memory cell will be lost due to wear-out of the memory cell. To address such an issue, the wear-out state of memory cells is tracked and managed in response to write and read operations. Specifically, when accesses to a certain page occur frequently and the number of accesses to the page exceeds a predetermined number of times, in order to level out wear-out between memory cells, processing of changing the association between the page and the memory cells is performed so that the data of the page is stored in memory cells different from the memory cells associated with the page. This processing is called a wear leveling process.

In the case of a non-volatile memory that wears out mainly due to the write operation, the number of times the wear leveling process is executed is roughly proportional to the number of accesses to memory cells (or pages) in write operations. Furthermore, the number of times the wear leveling process is executed is very small compared to the number of accesses. For example, the number of executions of the wear leveling process is about $1/1000$ of the number of accesses. Therefore, the history information of the wear leveling process can be used as a rough access history to memory cells (or pages). Although the details will be described below, in the following embodiments, the history information of the wear leveling process includes an address list of pages on which the wear leveling process has been executed.

1. First Embodiment

[1-1. Overall Configuration of Memory System 1]

A memory system according to a first embodiment will be described. A memory system 1 according to the first embodiment includes, for example, a memory controller 10 and a non-volatile memory 20. The memory controller 10 controls the non-volatile memory 20. In the present embodiment, the memory controller 10 has a function of controlling read operations and write operations of the non-volatile memory 20. The non-volatile memory 20 is an example of a semiconductor memory device.

FIG. 1 is a block diagram illustrating the configuration of the memory system 1 according to the first embodiment. As shown in FIG. 1, the memory system 1 includes the memory controller 10 and the non-volatile memory 20 including a plurality of memory cells. The memory system 1 can be connected to a central processing unit (CPU) 90 and functions as a main memory device for the CPU 90. The CPU 90 is provided in, for example, an electronic device such as a personal computer, a mobile terminal (for example, a tablet computer or a smartphone), and an imaging device. An electronic device can be called an information processing device. An information processing device may include the memory system 1 and the CPU 90. The CPU 90 transmits write requests and read requests to the memory system 1.

Although FIG. 1 illustrates a configuration in which the number of CPUs 90 is one, a plurality of CPUs 90 may be provided, and a plurality of CPUs 90 may be connected to each other. The CPU 90 may be replaced by other arithmetic processing units such as a graphics processing unit (GPU) or accelerator.

The memory system 1 may be an storage device. In this case, the CPU 90 of FIG. 1 may be replaced with a host computer. The memory system 1 may be a memory card or the like in which the memory controller 10 and the non-volatile memory 20 are configured as one package, or may be a solid state drive (SSD) or the like.

The memory controller 10 controls write operations to write data into the non-volatile memory 20 according to write requests from the CPU 90 and controls read operations to read data from the non-volatile memory 20 according to read requests from the CPU 90.

The memory controller 10 is, for example, a semiconductor integrated circuit configured as SoC (System-On-a-Chip). Part or all of the operation of each component of the memory controller 10 described below is implemented by hardware, but may be implemented by the CPU executing firmware.

The memory controller 10 includes a host interface (I/F) 11, a command processing unit 12, an NVM control unit 13, a wear-out management unit 14, a first buffer (BF) 15, and a pin control unit 16. These functional blocks are interconnected by an internal bus 19.

The host interface 11 receives write requests and read requests from the CPU 90 functioning as a host. A write request includes a write command, a write address, and a write data. A read request includes a read command and a read address. The host interface 11 transfers the received write request or read request to the command processing unit 12. The host interface 11 transmits data read from the non-volatile memory 20, a response from the command processing unit 12, and the like to the CPU 90.

The command processing unit 12 executes the control according to commands received from the CPU 90 via the host interface 11. For example, upon receiving a write request from the CPU 90, the command processing unit 12 translates a write address corresponding to a logical address into a physical address according to the write command. This translation determines the physical address in the non-volatile memory 20 as the page to execute the write operation. The command processing unit 12 executes a write operation of the write data for the physical address. As the logical address, for example, Logical Block Addressing (LBA) is used. The physical address indicates the physical location in the non-volatile memory 20 of the page where the data is stored. The command processing unit 12 outputs the write data received from the CPU 90 and the physical address determined by the above translation to the NVM control unit 13 and the wear-out management unit 14.

Upon receiving a read request from the CPU 90, the command processing unit 12 translates the read address corresponding to the logical address into a physical address. This translation determines the physical address in the non-volatile memory 20 as the page to execute the read operation. The command processing unit 12 executes a read operation of data for the physical address. The command processing unit 12 outputs the physical address determined by the above translation to the NVM control unit 13 and the wear-out management unit 14. Although the details will be described below, when the pin control unit 16 performs the control using a physical address, the command processing unit 12 may output the physical address to the pin control unit 16.

The NVM control unit 13 accesses the non-volatile memory 20 based on the access type (write operation or read operation) and the physical address input from the command processing unit 12 and executes the control of a read operation or a write operation for the non-volatile memory 20. The NVM control unit 13 may include an Error Check and Correct (ECC) circuit. The ECC circuit performs error correction encoding processing on the data transferred from the command processing unit 12 and generates parity. The ECC circuit outputs code words containing data and parity to the non-volatile memory 20. The ECC circuit uses the code words read from the non-volatile memory 20 to execute the error correction decoding processing, and transfers the decoded data to the command processing unit 12.

The wear-out management unit 14 manages the physical address of the non-volatile memory 20 and the wear-out information of the page located at that physical address, which are acquired from the non-volatile memory 20. For example, in the present embodiment, the wear-out management unit 14 manages the number of times the write operation and the read operation have been executed on a page located at a predetermined physical address (hereinafter referred to as "the number of writes" and "the number of reads"). The wear-out management unit 14 counts the number of writes and the number of reads to a specific page and writes back to the non-volatile memory 20. At this time, the data may be written via the first buffer 15 in the same manner as the write of user data.

The first buffer 15 functions as a data buffer as described above. The first buffer 15 also functions as a cache memory. The first buffer 15 temporarily stores the data received from the CPU 90 by the memory controller 10 until the data is stored in the non-volatile memory 20, and temporarily stores the data read from the non-volatile memory 20 until the data is transmitted to the CPU 90. As the first buffer 15, for example, general-purpose memory such as SRAM (Static Random Access Memory) or DRAM (Dynamic Random Access Memory) may be used. In the present embodiment, the configuration in which the first buffer 15 is provided in the memory controller 10 is illustrated, but the configuration is not limited thereto. The first buffer 15 may be provided outside the memory controller 10.

The pin control unit 16 has a function of managing data to be subjected to the pinning process in the first buffer 15 based on history information of the wear leveling process, in addition to the function of an usual buffer control unit. In other words, the pin control unit 16 determines the data for which the pinning process is executed based on the history information of the wear leveling process so that data with a high access frequency is not excluded from the first buffer 15. The detailed configuration and functions of the pin control unit 16 will be described below. The wear leveling process in the present embodiment is executed with a write operation as a trigger.

The non-volatile memory 20 includes a plurality of memory chips 21. The memory controller 10 controls each of the plurality of memory chips 21. Specifically, the memory controller 10 executes a data write operation and a data read operation for each memory chip 21. Each of the plurality of memory chips 21 is connected to the memory controller 10 via a bus. Each memory chip 21 includes a plurality of blocks 22. Each block 22 includes a plurality of pages 23. In the present embodiment, the above write operation and read operation are executed in units of a page 23. Therefore, the pinning process and the like in the present embodiment are performed in page units. Alternatively, the pinning process may be performed in units other than the above. For example, the pinning process may be performed with a plurality of pages as one unit, or the pinning process may be performed on a part of one page.

The memory chip 21, the block 22, and the page 23 described above show an example of the hierarchical structure or grouping of the memory, and one embodiment of the present disclosure is not limited to the above configuration. In addition to the write and read operations described above, an erasing operation may be performed in page units. Each of the write operation, the read operation, and the erasing operation may be executed in the same unit (memory chip 21, block 22, or page 23), or at least one of each may be performed in different units. The write, read, and erasing operations may be performed in memory cell units.

The non-volatile memory 20 is a non-volatile memory that stores data in a non-volatile manner, such as a NAND flash memory or SCM (Storage Class Memory). As SCM, semiconductor memory devices such as NOR type flash memory, cross point type memory, Phase Change Memory (PCM), Magnetoresistive Random Access Memory (MRAM), Resistance Random Access Memory (ReRAM), Ferroelectric Random Access Memory (FeRAM), and Oxide Semiconductor Random Access Memory (OSRAM) are used. It is not essential that the non-volatile memory 20 is a semiconductor memory device. The present embodiment can also be applied to various storage media other than semiconductor storage devices.

In the memory chip 21 of the non-volatile memory 20, a plurality of memory cells are located in an array. Each memory cell can store binary or multiple values (ternary or more values). The memory chip 21 includes word lines and bit lines connected to a plurality of memory cells. For example, a memory cell (or page) location is specified by a physical address including a chip address, a word line address, a bit line address, and the like that specify the memory chip 21.

The SCM used for the non-volatile memory 20 has performance characteristics between those of a main memory such as a DRAM (Dynamic Random Access Memory) and those of a storage (NAND flash memory, etc.). Specifically, the performance characteristics of the SCM falls between those of DRAM and those of NAND flash memory in terms of speed, cost, and life. Access granularity in SCM is as small as in DRAM. On the other hand, as the access granularity is small, the amount of data related to history information on access becomes large. As a result, in order to store such history information, it is necessary to increase the capacity of the first buffer 15, resulting in an increase in cost. If the above configuration is adopted without increasing the capacity of the first buffer 15, the amount of data that can be stored is limited, which makes it difficult to grasp long-term trends using history information on accesses.

To address such issues, in the present embodiment, long-term trends can be grasped by using the history information of the wear leveling process, which is proportional to the number of accesses by a factor of about $1/1000$, instead of the access history.

[1-2. Configuration of pin Control Unit 16]

Figure 2:
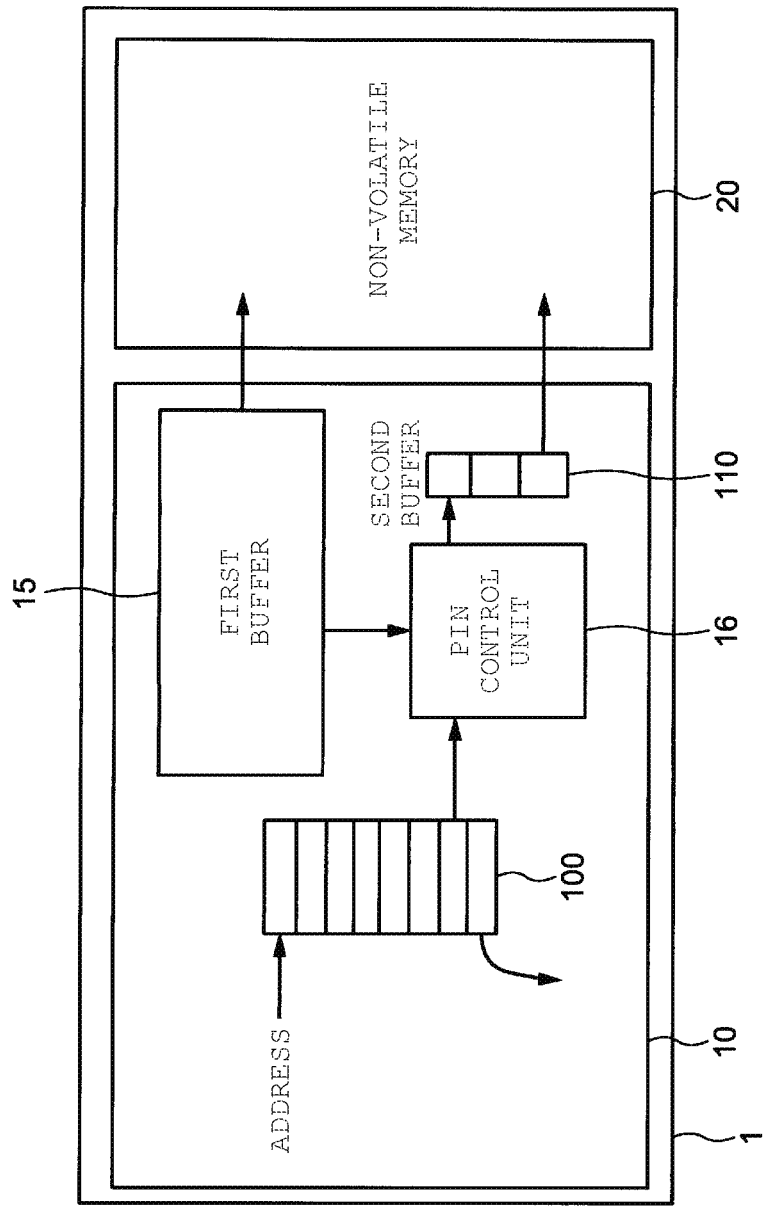
FIG. 2 is a block diagram showing a configuration of a non-volatile memory and a memory module according to the first embodiment.

A detailed configuration of the pin control unit 16 will be described with reference to FIG. 2. As shown in FIG. 2, the memory controller 10 includes a wear leveling history table 100 and a second buffer 110 in addition to the first buffer 15 and the pin control unit 16. The pin control unit 16 can be considered as an element that implements a part of the functions of the memory controller 10. In the following description, the function of the pin control unit 16 can also be called the function of the memory controller 10.

A wear leveling history is stored in the wear leveling history table 100. The wear leveling history is information related to the history of execution of the wear leveling processes on the non-volatile memory 20. In the present embodiment, N wear leveling histories related to the past N wear leveling processes are stored in the wear leveling history table 100 (hereinafter, N is a natural number). Although the details will be described below, the wear leveling history table 100 stores logical addresses of pages on which a wear leveling process has been executed as the wear leveling history. Information other than the logical address may be stored in the wear leveling history table 100 as the wear leveling history.

For example, a ring buffer is used as the wear leveling history table 100 in the present embodiment. That is, when the wear leveling history table 100 has no free space and new information is added to the table, the oldest information is evicted from the table (i.e., overwritten). However, the wear leveling history table 100 is not limited to the above configuration.

The second buffer 110 has the same configuration as the first buffer 15. However, the capacity of the second buffer 110 is about $1/1000$ to $1/10$ of the capacity of the first buffer 15. Although the details will be described below, the second buffer 110 stores data related to pages for which the pinning process has been executed by the pin control unit 16.

The pin control unit 16 manages the wear leveling history table 100. When the wear leveling process is executed, the pin control unit 16 adds the logical address of the page on which the wear leveling process is executed to the wear leveling history table 100. This operation is called the updating of the wear leveling history table 100.

Furthermore, based on the wear leveling history table 100, the pin control unit 16 executes a pinning process on the data related to the page on which the above wear leveling process has been performed. Although the details will be described below, when the wear leveling process is executed and the wear leveling history table 100 is updated and the logical address of the page related to the update is provided in the logical address of the page on which the wear leveling process was executed in the past N times, the pin control unit 16 executes a pinning process on the data related to the page. In this case, if data related to the page is stored in the first buffer 15, the pin control unit 16 extracts the necessary information from the first buffer 15 and stores the extracted information in the second buffer 110.

The above-described first buffer 15 and second buffer 110 are sometimes simply referred to as "buffers". In this case, the second buffer 110 corresponds to the "pinning area" of the buffer. The second buffer 110 is a buffer provided in an area where overwrite is restricted among the buffers. Meanwhile, the first buffer 15 is a buffer that is not subject to overwrite restrictions based on the wear leveling history table 100 among the buffers. In the present embodiment, the first buffer 15 and the second buffer 110 are provided separately.

When new data is added to the first buffer 15, if there is no free space in the first buffer 15, the pin control unit 16 evicts the data stored in the first buffer 15 according to a predetermined condition. Similarly, when new data is added to the second buffer 110, if there is no free space in the second buffer 110, the pin control unit 16 evicts the data stored in the second buffer 110 according to a predetermined condition. The conditions for evicting data in the first buffer 15 and the conditions for evicting data in the second buffer 110 may be the same or different.

[1-3. Flowchart of Pinning Process]

Figure 3:
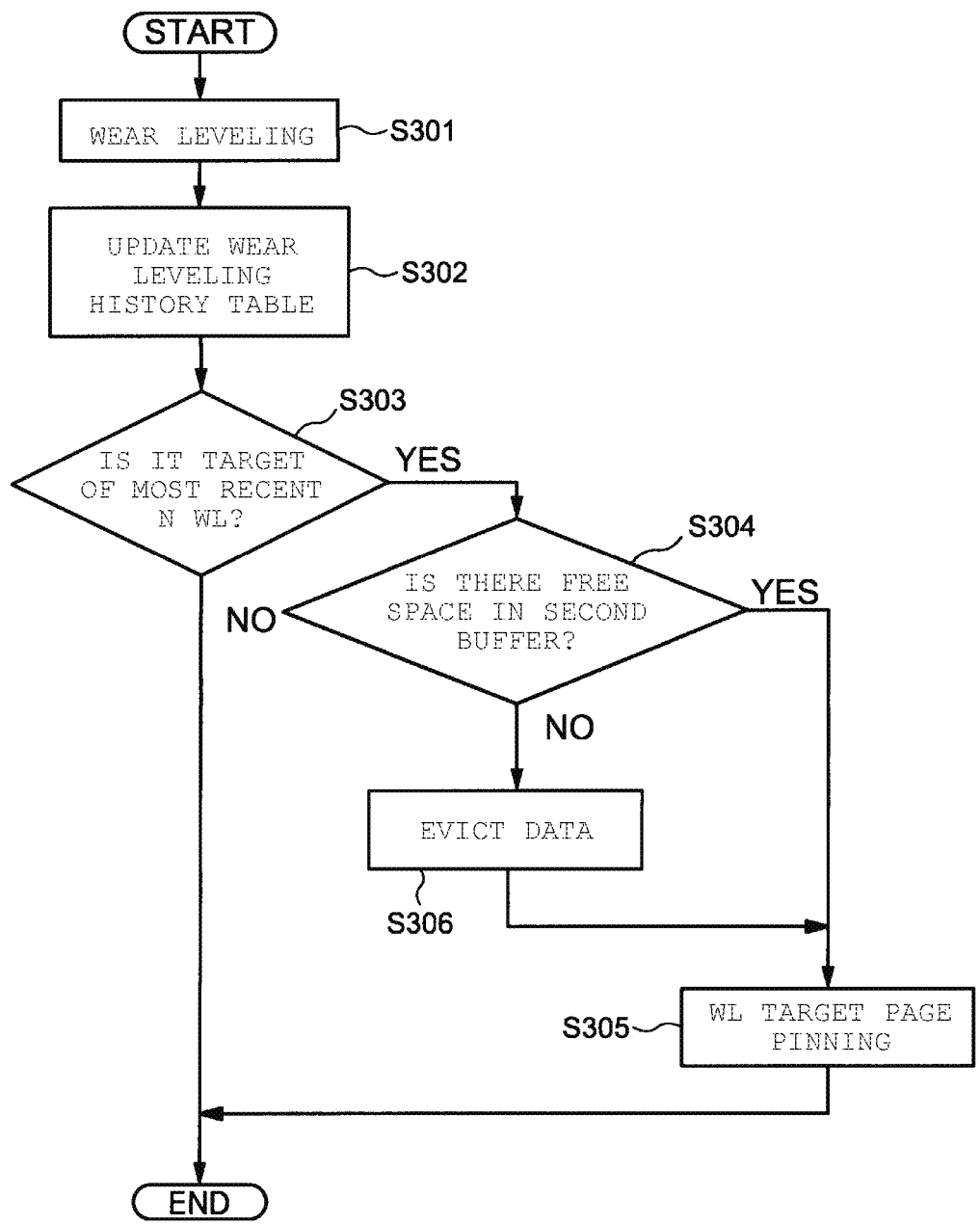
FIG. 3 is a flowchart showing a pinning process of the memory system according to the first embodiment.

The operation of the pinning process will be described using FIG. 3. FIG. 3 is a flowchart illustrating the pinning process of the memory system according to the first embodiment. The operations described in the flowchart below are executed by the memory controller 10 (e.g., the wear-out management unit 14 and the pin control unit 16).

As shown in FIG. 3, when the wear leveling process is executed based on a predetermined condition (step S301), the wear leveling history table 100 is updated based on the page on which the wear leveling process was executed (step S302). Specifically, an update is performed in which the logical address of the page is added to the wear leveling history table 100. The update is executed by the pin control unit 16.

Following the update process of S302, it is determined whether the page related to the update has been subjected to the most recent N wear leveling processes (step S303). Specifically, the pin control unit 16 determines whether the wear leveling history table 100 includes the same logical address as the logical address of the page added by the above update.

If it is determined in S303 that the page related to the update has been subjected to the most recent N wear leveling processes ("YES" in S303), it is determined whether there is a free space in the second buffer 110 (step S304). On the other hand, if it is determined in S303 that the updated page has not been subjected to the most recent N wear leveling processes ("NO" in S303), the operation shown in FIG. 3 ends without performing the pinning process.

In S304, if it is determined that there is a free space in the second buffer 110 ("YES" in S304), the pinning process is performed on the data related to the page on which the wear leveling process has been performed (step S305). Specifically, data related to the page is added to the second buffer 110. On the other hand, if it is determined in S304 that there is no free space in the second buffer 110 ("NO" in S304), the data stored in the second buffer 110 is evicted (step S306). Then, in S305, the data related to the above page is added to the area where space has been generated by the eviction. The operations of S306 and S305 can be collectively said to replace existing data with new data.

The determination in S303 is not limited to the above configuration, and the determination may be made by other methods. For example, instead of S303 or in addition to S303, a determination may be made as to whether the page related to the update is the same as the page on which the process has been executed M times or more (M is a natural number of 2 or more and N or less) out of the most recent N wear leveling processes. Instead of S303 or in addition to S303, a determination may be made as to whether the page related to the update is provided in a specific range of logical addresses.

As means to select the target of data eviction in S306, "FIFO" (First In, First Out) may be adopted in which the first stored data (oldest data) is selected from the data stored in the second buffer 110. Alternatively, "LFU"(Least Frequently Used) may be adopted in which data that has been referred to the least number of times is selected from the data stored in the second buffer 110. Further alternatively, "LRU" (Least Recently Used) may be adopted in which data that has passed the longest time since the data was last referred to is selected from the data stored in the second buffer 110.

[1-4. Data Configuration Stored in First Buffer 15]

FIG. 4 is a diagram showing an example of the data structure of a buffer according to the first embodiment. As shown in FIG. 4, the first buffer 15 has items of "entry number", "data", "tag", "valid", and "access history". These items are stored in association with each other. In the example of FIG. 4, data is stored in entry numbers "0" and "2", and entry numbers "1" and "3" are free (displayed as "XXXX").

In FIG. 4, the "entry number" range is determined based on the lower bits of the logical address. "Data" is write data corresponding to a write request from the CPU 90. "Tag" indicates the upper bits of the logical address. Based on the "entry number" and "tag" stored in the first buffer 15, the logical address of the data can be restored. "Valid" indicates the presence or absence of data in the entry. In the present embodiment, when "Valid" is "1", it indicates that data appears in that entry number, and when "Valid" is "0", it indicates that data does not appear in that entry number (the entry is vacant). "Access history" indicates history information about access to data, and is information based on the number of past accesses, for example. Eviction of data from the first buffer 15 is performed based on this "access history".

The configuration of data stored in the second buffer 110 is similar to that of FIG. 4. However, in the second buffer 110, unlike the first buffer 15, the range of entry numbers is not limited by logical addresses. In the second buffer 110, logical addresses are stored as "tags". However, the configuration of the second buffer 110 may be the same as the configuration of the first buffer 15. Furthermore, in the second buffer 110, the "access history" item may be omitted.

[1-5. Data Configuration Stored in Wear Leveling History Table 100]

Figure 5:
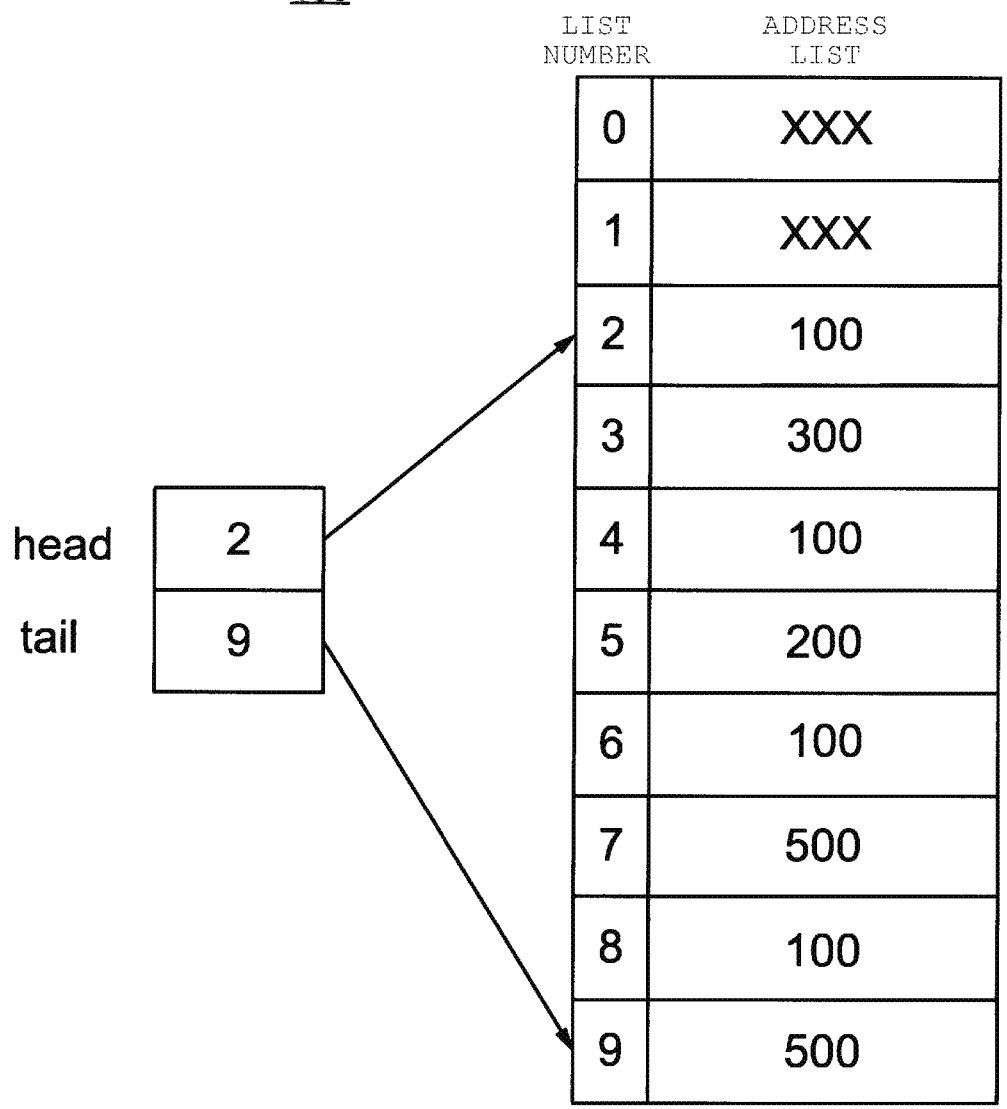
FIG. 5 is a diagram showing an example of a data configuration of a wear leveling history table according to the first embodiment.

FIG. 5 is a diagram showing an example of the data configuration of a wear leveling history table according to the first embodiment. As shown in FIG. 5, in the wear leveling history table 100, logical addresses of pages on which the wear leveling process has been executed are stored as an address list. In FIG. 5, logical addresses from list numbers "2" to "9" are specified as a valid range. Therefore, "2" is specified as "head" and "9" is specified as "tail". A wear leveling process is performed, and the "head" and "tail" values are updated each time a logical address is added to or deleted from the address list. In the address list shown in FIG. 5, the address indicated by "head" is the oldest address in the valid range, and the address indicated by "tail" is the latest address. FIG. 5 shows a configuration in which list numbers "0" and "1" are free (displayed as "XXX").

For example, a case will be described where the wear leveling history table 100 stores logical addresses in list numbers "2" to "8" before the wear leveling process is executed, and then the wear leveling process is executed on the page of the logical address "500". That is, before the wear leveling process is executed, the value of "head" is "2" and the value of "tail" is "8". By executing the wear leveling process, the logical address "500" is added to the list number "9" and the value of "tail" is updated to "9".

In this case, the wear leveling process executed for the logical address "500" added to the list number "9" is called a "first wear leveling process", and the logical address is called a "first wear leveling history". N times (N=7) of wear leveling processes executed for the logical addresses corresponding to the list numbers "2" to "8" executed before the first wear leveling process are referred to as a "second wear leveling process", and N (N=7) logical addresses corresponding to the second wear leveling process are referred to as a "second wear leveling history". In this example, the wear leveling history table 100 can be considered to store the first wear leveling history and the second wear leveling history. The first wear leveling history can be referred to as a history related to updating, and the second wear leveling history can be referred to as a past history. The number of N is not limited to 7 and may be any natural number.

Using the above expressions, the operations of S301 to S303 and S305 in FIG. 3 will be described. First, in S301, the first wear leveling process is executed. Next, in S302, based on the first wear leveling process, the update is performed in which the first wear leveling history is added to the wear leveling history table 100. Specifically, the logical address "500" is added to the list number "9" in FIG. 5, and the value of "tail" is updated to "9". Then, in S303, it is determined whether the first wear leveling history is included in N (N=7) second wear leveling histories. Specifically, it is determined whether the same logical address as the logical address "500" of list number "9", which is the first wear leveling history, is included in the logical addresses of list numbers "2" to "8", which are the second wear leveling history. In the case of FIG. 5, among the N (N=7) second wear leveling histories, since the logical address of the list number "7" is "500", a determination is made as the target page of the first wear leveling process was the most recent N times (N=7) wear leveling process ("YES" in S303). Then, in S305, the data subjected to the first wear leveling process is stored in the second buffer 110.

Similarly, the operations of S303, S304, and S306 in FIG. 3 will be described using the above expressions. In the determination in S303, if the first wear leveling history is provided in the N second wear leveling histories ("YES" in S303), in S304, a determination is made as to whether the second buffer 110 has the capacity to store new data. If it is determined in S304 that the second buffer 110 has no capacity to store new data ("NO" in S304), then in S306, the existing data stored in the second buffer 110 is replaced with the target data for which the first wear leveling process has been performed.

[1-6. Flowchart of Write Operation]

Figure 6:
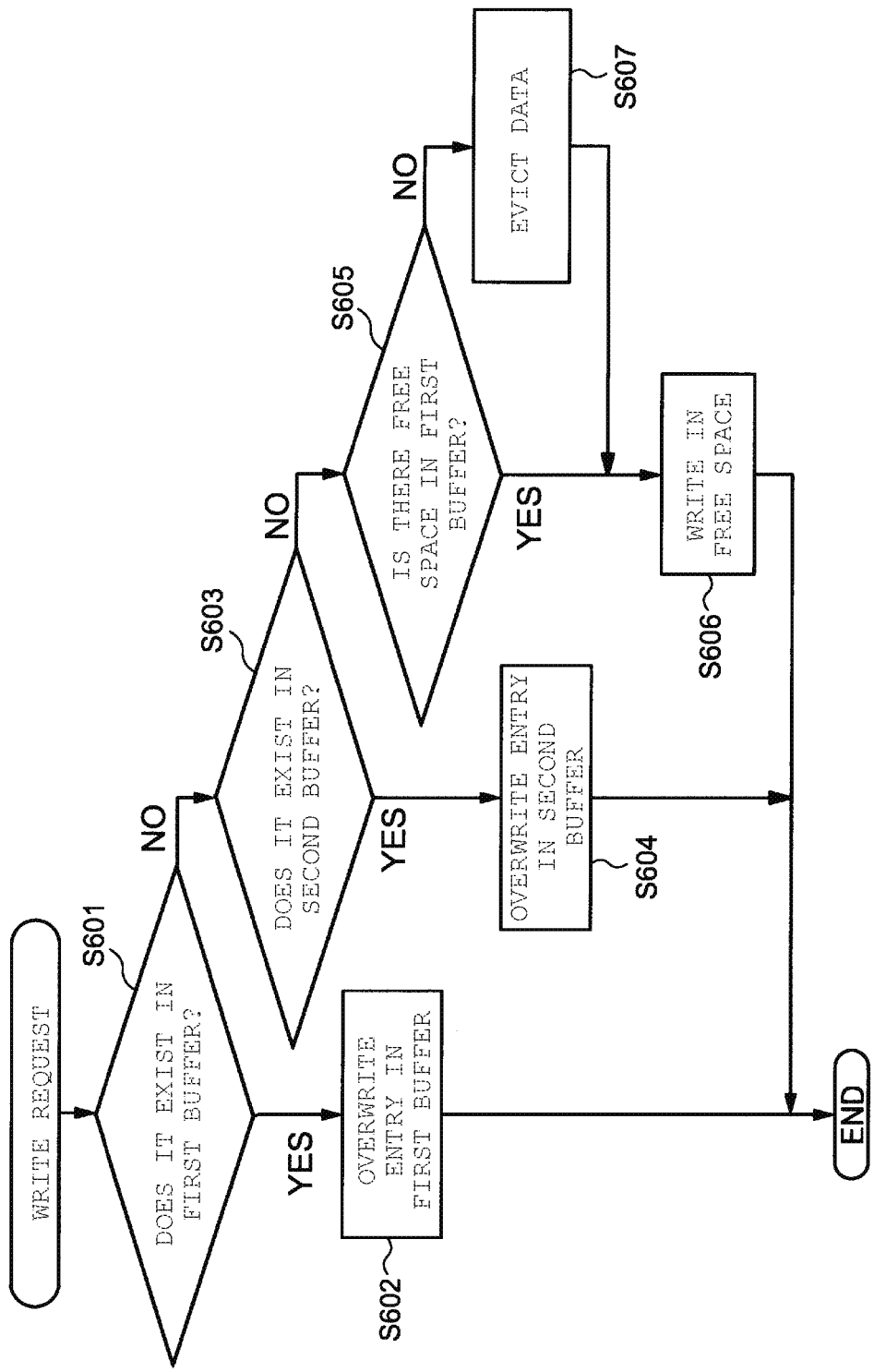
FIG. 6 is a flowchart showing a write operation of the memory system according to the first embodiment.

FIG. 6 is a flowchart showing the write operation of the memory system according to the first embodiment. When the memory controller 10 receives a write request from the CPU 90, it is determined whether write data related to the write request exists in the first buffer 15 (step S601).

If it is determined in S601 that the write data exists in the first buffer 15 ("YES" in S601), the entry in the first buffer 15 is overwritten (step S602). Specifically, the data and access history (see FIG. 4) are updated for the entry number corresponding to the write data. On the other hand, if it is determined in S601 that the write data does not exist in the first buffer 15 ("NO" in S601), it is determined whether the write data exists in the second buffer 110 (step S603).

If it is determined in S603 that the write data exists in the second buffer 110 ("YES" in S603), the entry in the second buffer 110 is overwritten (step S604). Specifically, the data is updated for the entry number corresponding to the write data. On the other hand, if it is determined in S603 that the write data does not exist in the second buffer 110 ("NO" in S603), it is determined whether there is a free space in the first buffer 15 (step S605).

In S605, if it is determined that there is a free space in the first buffer 15 ("YES" in S605), the write operation of the write data is performed in the free area (step S606). On the other hand, if it is determined in S605 that there is no free space in the first buffer 15 ("NO" in S605), the data in the first buffer 15 is evicted (step S607), and the above-mentioned write data is written in the area where the free space is generated in the first buffer 15 (S606). "FIFO", "LFU", or "LRU" may be adopted as means to select the target of data eviction in S607.

[1-7. Flowchart of Read Operation]

Figure 7:
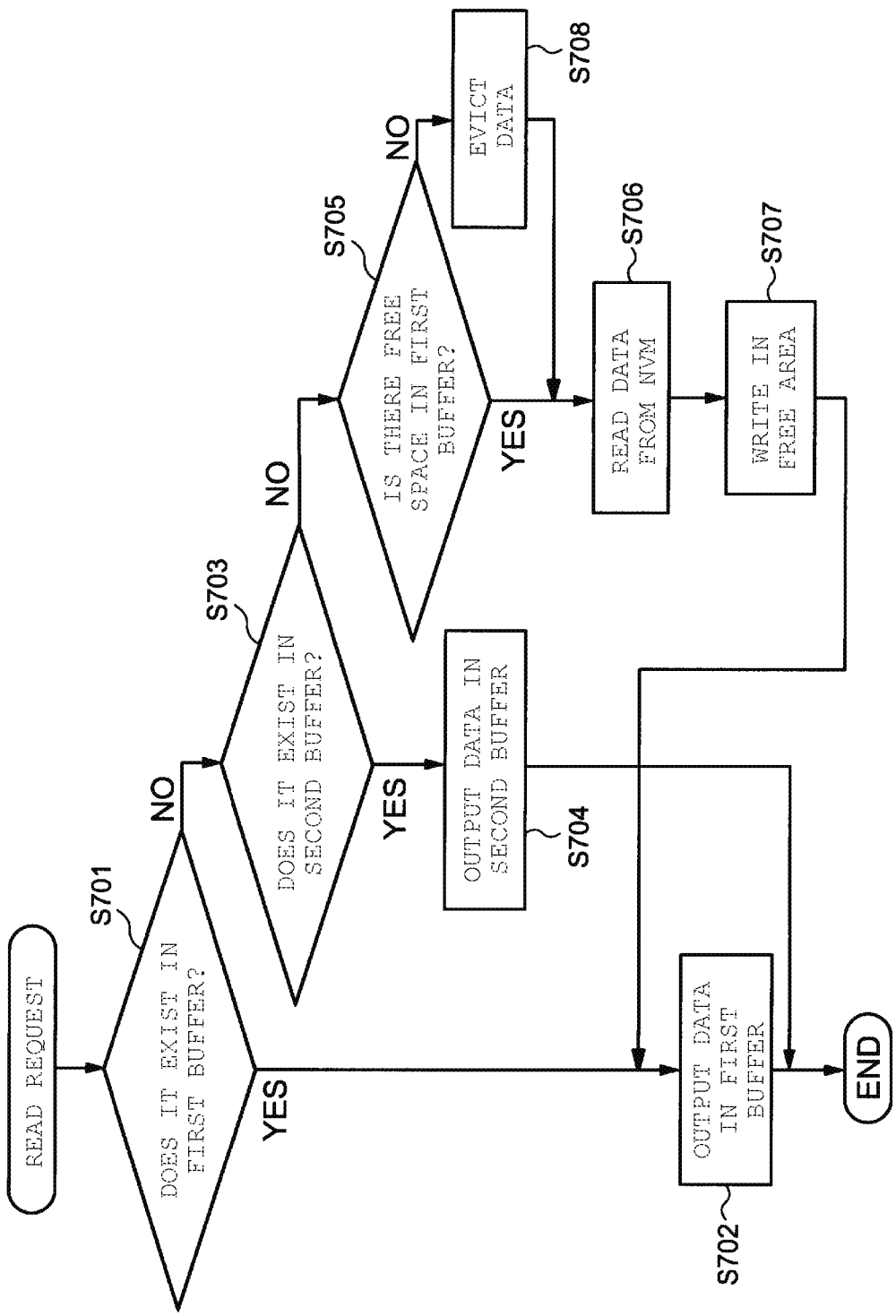
FIG. 7 is a flowchart showing a read operation of the memory system according to the first embodiment.

FIG. 7 is a flowchart showing a read operation of a memory system according to one embodiment. Upon receiving a read request from the CPU 90, the memory controller 10 determines whether the data of the read address related to the read request exists in the first buffer 15 (step S701).

When it is determined in S701 that the data exists in the first buffer 15 ("YES" in S701), the data stored in the first buffer 15 is output (step S702). On the other hand, if it is determined in S701 that the data does not exist in the first buffer 15 ("NO" in S701), it is determined whether the data exists in the second buffer 110 (step S703).

If it is determined in S703 that the data exists in the second buffer 110 ("YES" in S703), the data stored in the second buffer 110 is output (step S704). On the other hand, if it is determined in S703 that the data does not exist in the second buffer 110 ("NO" in S703), it is determined whether there is a free space in the first buffer 15 (step S705).

In S705, if it is determined that there is a free space in the first buffer 15 ("YES" in S705), the data is read from the non-volatile memory 20 (step S706), and the read data is written in the area where a free space exists (step S707). On the other hand, if it is determined in S705 that there is no free space in the first buffer 15 ("NO" in S705), the data in the first buffer 15 is evicted (step S708), the data read from the non-volatile memory 20 is written in the area where the free space is generated in the first buffer 15 (S706, S707), and then, the data output in S702 is executed.

As described above, according to the memory system of the present embodiment, by executing the pinning process using the history information of the wear leveling processes instead of the access history, it is not necessary to increase the size of the buffer and a long-term trend of data access can be grasped. As a result, it is possible to improve the processing speed while reducing an increase in cost.

2. Second Embodiment

A memory system 1A according to a second embodiment will be described with reference to FIGS. 8 to 15. Since the configuration of the memory system 1A according to the second embodiment is similar to the configuration of the memory system 1 according to the first embodiment, the description of common elements will be omitted and differences will be mainly described. In the second embodiment, the second buffer 110 of FIG. 2 is not provided and an area for implementing the function of the second buffer 110 is provided in a first buffer 15A. In the following description, when describing the same configuration as that of the memory system 1 shown in FIGS. 1 and 2, the letter "A" may be added after the reference numerals shown in FIGS. 1 and 2 to omit the description.

[2-1. Configuration of Pin Control Unit 16A]

A detailed configuration of the pin control unit 16A will be described with reference to FIG. 8. Comparing the memory controller 10A shown in FIG. 8 with the memory controller 10 shown in FIG. 2, the configurations of the first buffer 15A and the pin control unit 16A (FIG. 8) are different from the configurations of the first buffer 15 and the pin control unit 16 (FIG. 2). The pin control unit 16A can be considered as an element that implements a part of the functions of the memory controller 10A. In the following description, the function of the pin control unit 16A can also be called the function of the memory controller 10A.

Figure 8:
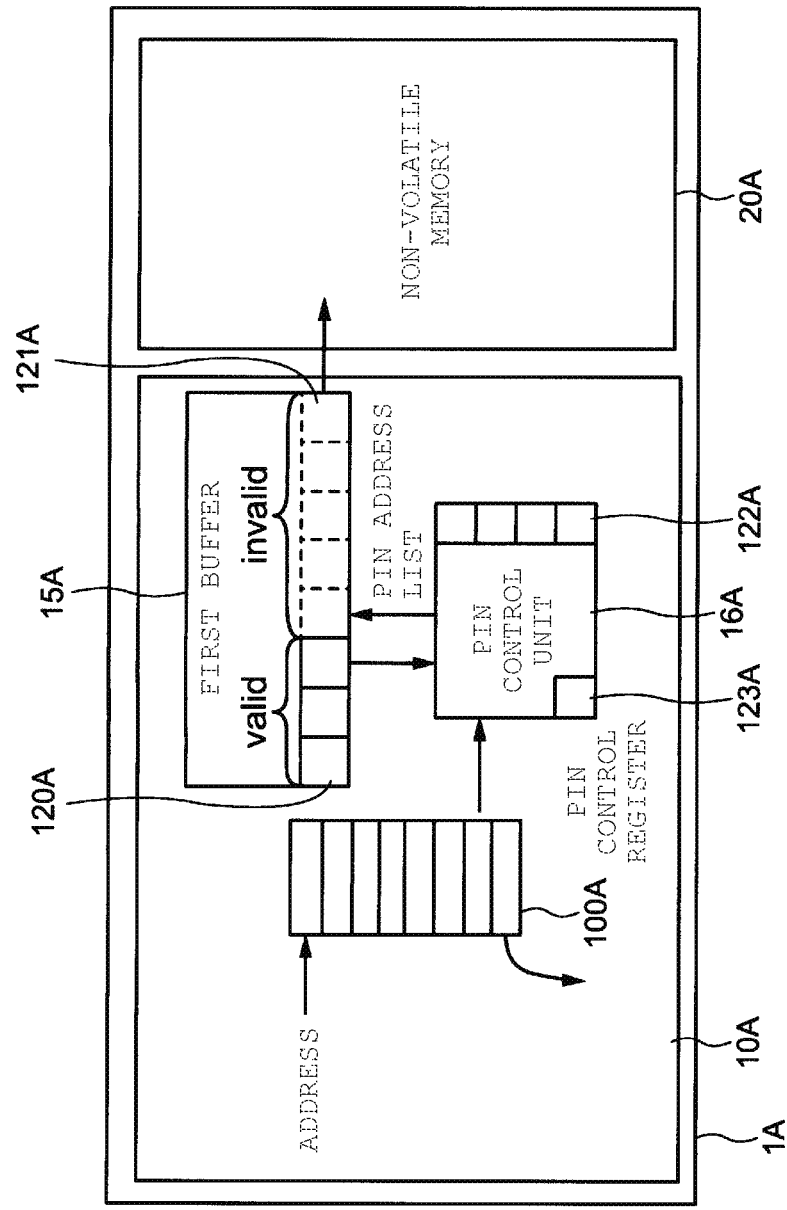
FIG. 8 is a block diagram showing a configuration of a non-volatile memory and a memory module according to a second embodiment.

As shown in FIG. 8, the first buffer 15A is divided into a pinning area 120A and a non-pinning area 121A. In FIG. 8, the pinning area 120A is an area labeled "valid" and is indicated by a solid-line frame. Meanwhile, the non-pinning area 121A is an area indicated as "invalid" and indicated by a dotted line frame. The pinning area 120A is an area that implements the function of the second buffer 110 in FIG. 2, and stores data related to pages on which the pinning process has been executed by the pin control unit 16A. In other words, the pinning area 120A corresponds to the second buffer 110 of FIG. 2.

In the first buffer 15A, the size (e.g., number of bits) of the pinning area 120A is variable. In other words, the number of data on which the pinning process is performed is variable. In the present embodiment, the configuration in which the area of the first buffer 15A can be divided into the pinning area 120A or the non-pinning area 121A is exemplified, but it is not limited to this configuration. For example, the first buffer 15A may have a configuration in which a part of the area is an area that can be divided into the pinning area 120A or the non-pinning area 121A, and the other area is always the non-pinning area 121A without division. The ratio of the pinning area 120A and the non-pinning area 121A in the first buffer 15A can be adjusted as appropriate. Adjustment of the ratio may be performed by an instruction from the CPU 90, for example.

The pin control unit 16A has a Pin address list 122A and a pin control register 123A.

The Pin address list 122A stores candidate logical addresses for executing the pinning process. Although the details will be described below, at the timing of executing the pinning process, the data to be subjected to the pinning process may not be stored in the first buffer 15A (the data may have been evicted). Even in such a case, since the pin address list 122A stores candidate logical addresses for executing the pinning process, even if the data has already been evicted, when the data corresponding to the logical address is added to the first buffer 15A, the pinning process can be executed on that data.

In the present embodiment, the page for which the pinning process is to be executed is determined based on the wear leveling history table 100A and the logical address of the page is stored in the Pin address list 122A. After that, when the data related to the page of the logical address is added to the first buffer 15A, the data is subjected to the pinning process based on the Pin address list 122A and the target data is stored in the pinning area 120A.

When the pinning process is executed for a specific page, the wear leveling process for that page is not executed unless the page is unpinned by an unpinning process. As a result, the latest (last added) entry among the entries including the address of the page in the wear leveling history table 100A corresponds to the wear leveling process that caused the latest pinning process. The Pin address list 122A stores the target addresses of the wear leveling process that caused the pinning process of the wear leveling history table 100A in chronological order. According to the procedure of FIG. 10, the unpinning process is performed in the order in which the pinning process was executed. That is, as a result, the data configuration of the Pin address list 122A is the same as the data configuration of the wear leveling history table 100 (see FIG. 5).

Information specifying the pinning area 120A in the first buffer 15A is stored in the pin control register 123A. For example, the pin control register 123A stores information specifying an entry number corresponding to the pinning area 120A in the first buffer 15A, or flag information indicating whether each entry in the first buffer 15A corresponds to the pinning area 120A. Also, in the pin control register 123A, the upper limit of the size of the pinning area 120A and the threshold value for determining whether the pinning process can be executed are set. The size can be set by the CPU 90A, for example.

[2-2. Flowchart of Pinning Process]

Figure 9:
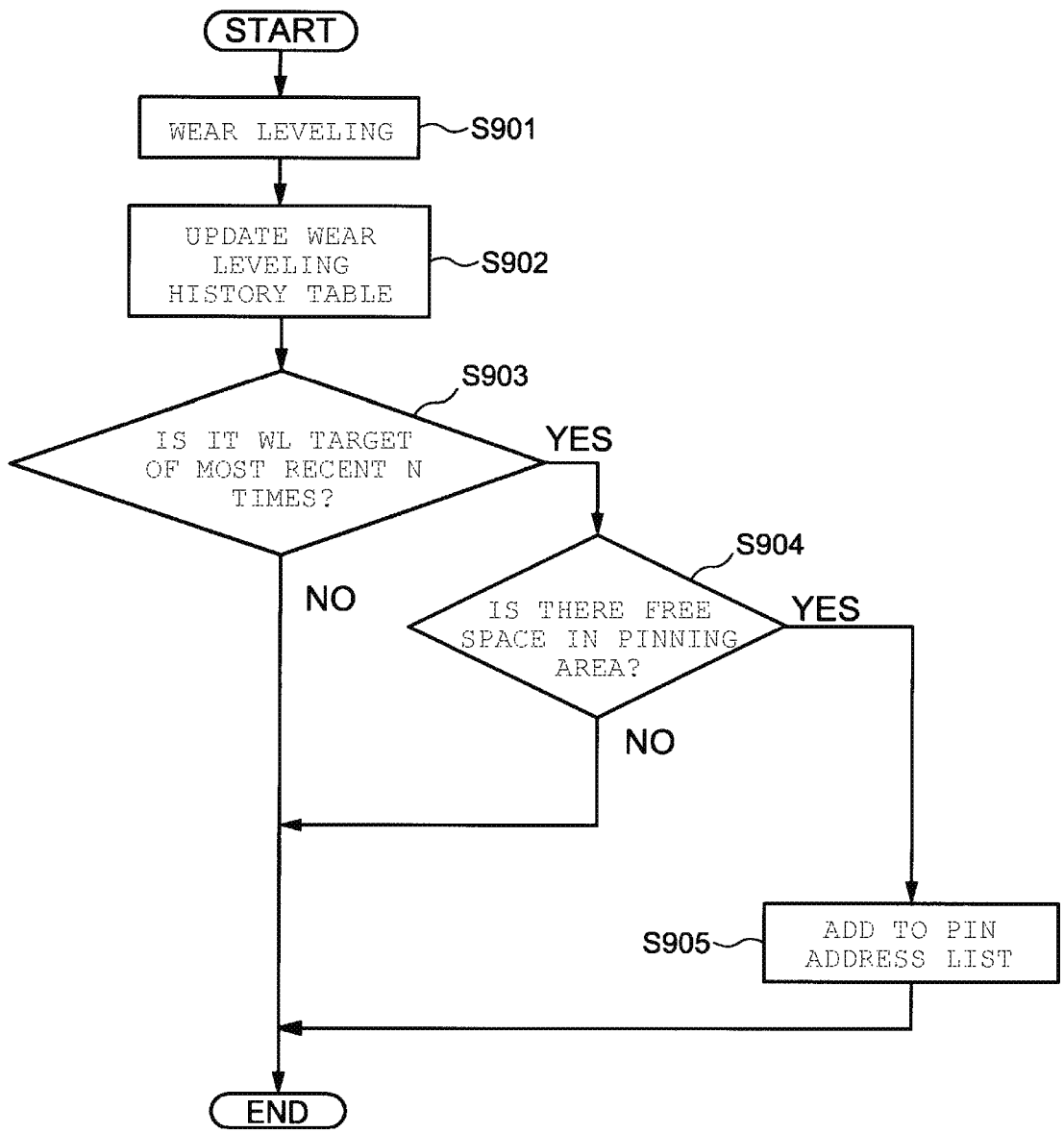
FIG. 9 is a flowchart showing a pinning process of a memory system according to the second embodiment.

The operation of the pinning process will be described using FIG. 9. FIG. 9 is a flowchart illustrating the pinning process of the memory system according to the second embodiment. The operations described in the following flowchart are executed by the memory controller 10A. In the present embodiment, a case is described in which when the wear leveling process is executed, the data of the page on which the wear leveling process has been executed is evicted from the first buffer 15A.

In the operation flow of FIG. 9, since steps S901 to S903 are the same steps as S301 to S303 of FIG. 3, the descriptions thereof will be omitted. However, in the case of the present embodiment, the data of the page on which the wear leveling process was executed in step S903 does not exist in the first buffer 15A. Therefore, even if the page for which the pinning process is to be executed is specified in S903, the data related to that page cannot be extracted from the first buffer 15A, so the following operation is performed.

As shown in FIG. 9, when it is determined in S903 that the page related to the update has been subjected to the most recent N wear leveling processes ("YES" in S903), it is determined whether there is a free space in the pinning area 120A of the first buffer 15A (step S904). On the other hand, if it is determined in S903 that the page related to the update has not been subjected to the most recent N wear leveling processes ("NO" in S903), the operation shown in FIG. 9 ends.

If it is determined in S904 that there is a free space in the pinning area 120A ("YES" in S904), the logical address of the page subjected to the wear leveling process is added to the Pin address list 122A (step S905). On the other hand, if it is determined in S904 that there is no free space in the pinning area 120A ("NO" in S904), the operation shown in FIG. 9 ends. After that, when data related to the logical address stored in the Pin address list 122A is added to the first buffer 15A, the pinning process is performed on the data.

Figure 10:
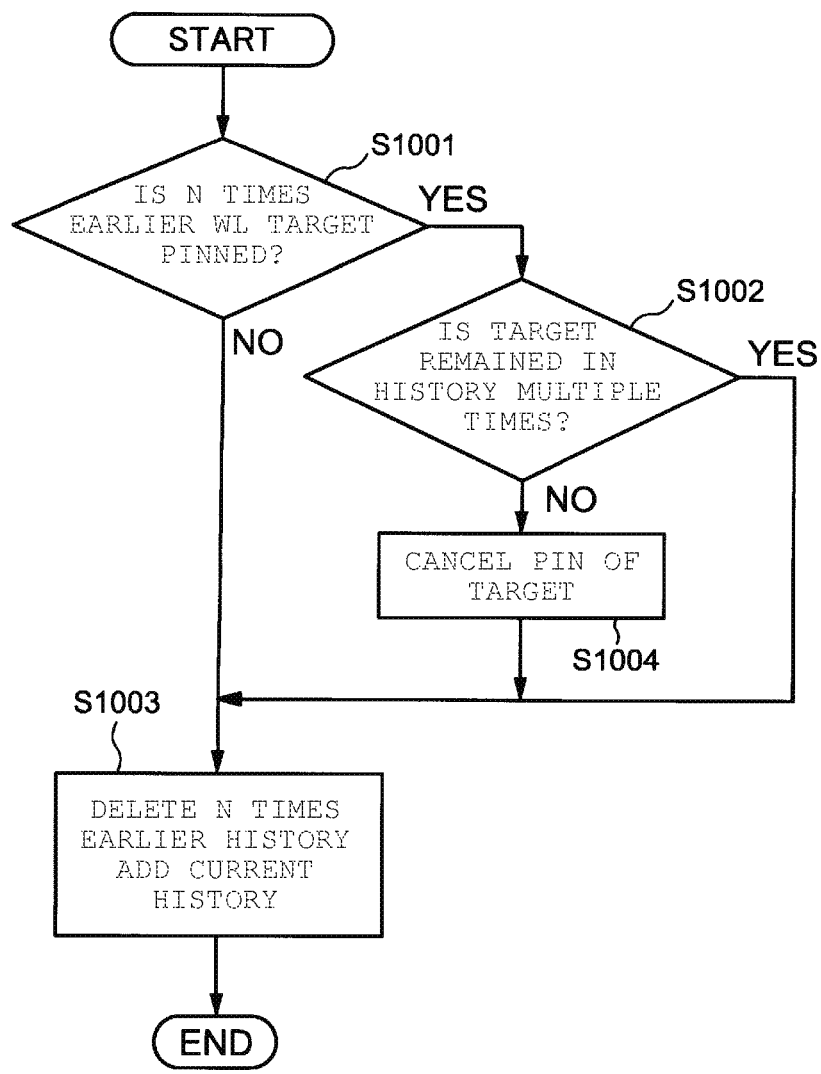
FIG. 10 is a flowchart showing an update process of a wear leveling history table of the memory system according to the second embodiment.

FIG. 10 is a flowchart showing the update process of the wear leveling history table of the memory system according to the second embodiment. FIG. 10 is an operation flow describing in detail the operation in S902 of FIG. 9.

First, it is determined whether data related to the page on which the wear leveling process was performed N times earlier is stored in the pinning area 120A (step S1001). In S1001, if the data is stored in the pinning area 120A ("YES" in S1001), it is determined whether the logical address related to the data appears multiple times in the wear leveling history table 100A (step S1002). On the other hand, if it is determined in S1001 that the data is not stored in the pinning area 120A ("NO" in S1001), the logical address related to the wear leveling process N times earlier is deleted from the wear leveling history table 100A, a logical address related to the newly executed wear leveling process is added to the wear leveling history table 100A (step S1003).

In S1002, if the logical address related to the above data appears multiple times in the wear leveling history table 100A ("YES" in S1002), the operation of S1003 is executed. On the other hand, if it is determined that the logical address related to the data does not appear multiple times in the wear leveling history table 100A ("NO" in S1002), the data subjected to the pinning process is unpinned, i.e., an unpinning process is performed for the data (step S1004). In this case, the data for which the unpinning process has been performed may be stored in the non-pinning area 121A or may be stored in the non-volatile memory 20A by evicting the data. As described above, by performing the unpinning process for addresses with a low access frequency, it is possible to eliminate data with a relatively low possibility of being used from the pinning area 120A and effectively utilize the pinning area 120A.

[2-3. Data Configuration Stored in First Buffer 15A]

FIG. 11 is a diagram showing an example of the data structure of a buffer according to the second embodiment. The data structure of the first buffer 15A shown in FIG. 11 is similar to the data structure of the first buffer 15 shown in FIG. 4. The data configuration of the first buffer 15A differs from that of the first buffer 15 in that the configuration of the first buffer 15A has items of "Pin flag" and "Pin counter".

"Pin flag" is a flag that indicates whether the pinning process is being executed on the data stored in that entry number. In FIG. 11, when the "Pin flag" is "1", it means that the pinning process is being executed on the data stored in the entry number. When the "Pin flag" is "0", it means that the pinning process is not executed on the data stored in the entry number. That is, data with a "Pin flag" of "1" corresponds to data stored in the pinning area 120A, and data with a "Pin flag" of "0" corresponds to data stored in the non-pinning area 121A. The "Pin counter" indicates the number of entries whose "Pin flag" is "1", and means the number of entries for which the pinning process is being executed in the first buffer 15A. When the pin control register 123A sets the upper limit of the pinning area 120A, the overall operation is controlled so that the number of this "Pin counter" does not exceed the setting.

FIGS. 12 and 13 are diagrams showing another example of the data configuration of the buffer according to the second embodiment. FIGS. 12 and 13 show another example of a data configuration different from that of FIG. 11. The data configuration of FIG. 12 differs from the data configuration of FIG. 11 in that the item "Pin flag" is not provided. Instead, a pinning management table 17A of FIG. 13 associated with FIG. 12 manages the entry numbers for which the pinning process is executed. As shown in FIG. 12, in this example, the pinning process is executed on the data of entry number "2". Therefore, as shown in FIG. 13, the entry number "0" of the pinning management table 17A stores the entry number "2" for which the pinning process is executed on the first buffer 15A.

[2-4. Flowchart of Write Operation]

Figure 14:
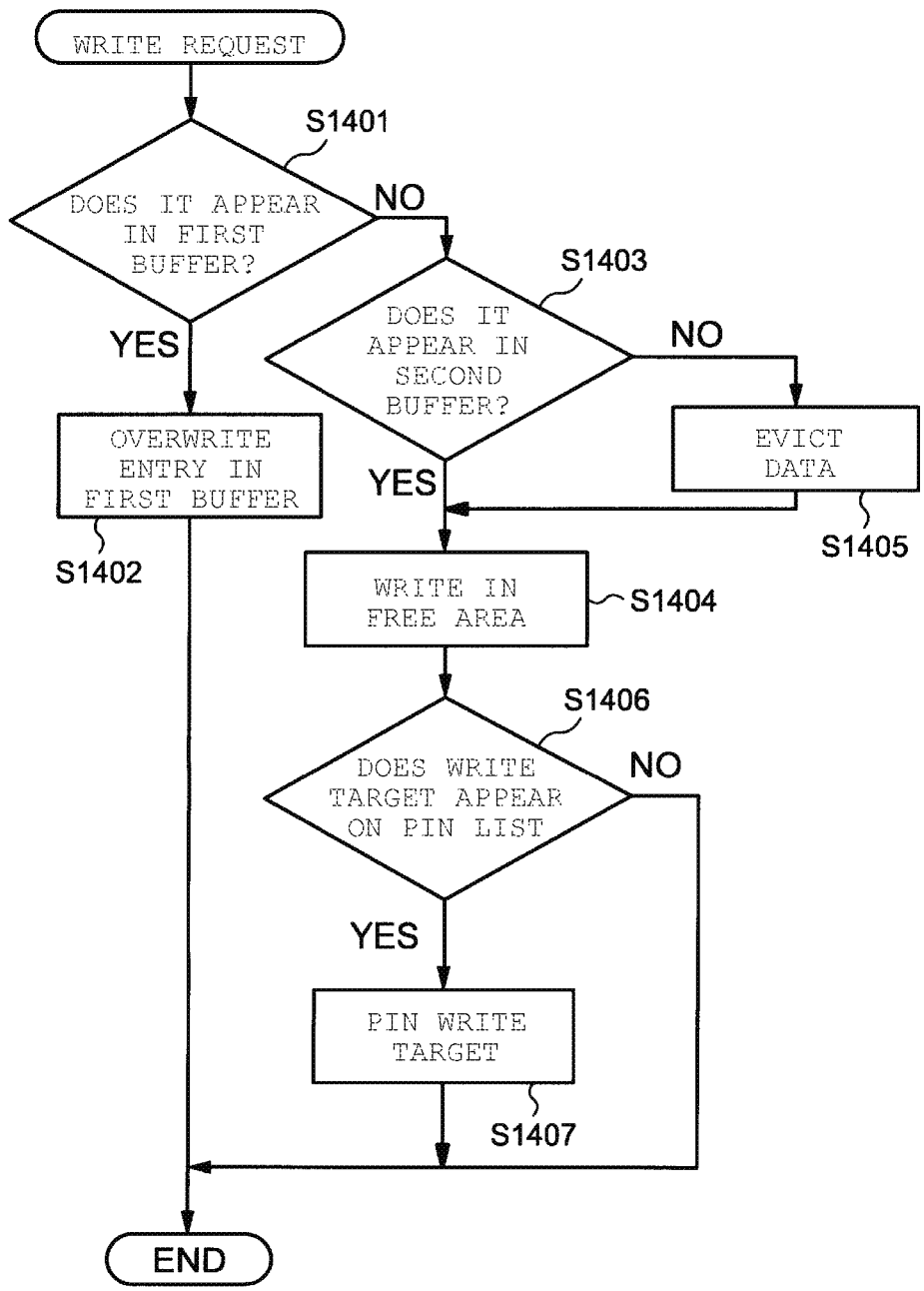
FIG. 14 is a flowchart showing a write operation of the memory system according to the second embodiment.

FIG. 14 is a flowchart showing a write operation of the memory system according to the second embodiment. When the memory controller 10A receives a write request from the CPU 90A, it is determined whether write data related to the write request exists in the first buffer 15A (step S1401).

If it is determined in S1401 that the write data exists in the first buffer 15A ("YES" in S1401), the entry in the first buffer 15A is overwritten (step S1402), and the flow shown in FIG. 14 ends. On the other hand, if it is determined in S1401 that the write data does not exist in the first buffer 15A ("NO" in S1401), it is determined whether there is a free space in the first buffer 15A (step S1403).

In S1403, if it is determined that there is a free space in the first buffer 15A ("YES" in S1403), the write data is written in the area with a free space (step S1404). On the other hand, if it is determined in S1403 that there is no free space in the first buffer 15A ("NO" in S1403), the data in the first buffer 15A is evicted (step S1405), and the above-described write data is written in the area where the free space is generated in the first buffer 15A (S1404). "FIFO", "LFU", or "LRU" may be adopted as means to select a target of data eviction in S1405.

When the writing of the write data is completed in S1404, it is determined whether the logical address of the page corresponding to the write data is stored in the Pin address list 122A (step S1406). In S1406, if the logical address is stored in the Pin address list 122A ("YES" in S1406), the pinning process is executed on the data of the page corresponding to the logical address (step S1407). On the other hand, if it is determined in S1406 that the logical address is not stored in the Pin address list 122A ("NO" in S1406), the flow shown in FIG. 14 ends.

As described above, according to the memory system of the present embodiment, the same effect as in the first embodiment can be obtained. Even if the data is not stored in the first buffer 15A at the time when the data to be subjected to the pinning process is determined, the pinning process can be executed on the data.

[2-5. Modification]

Figure 15:
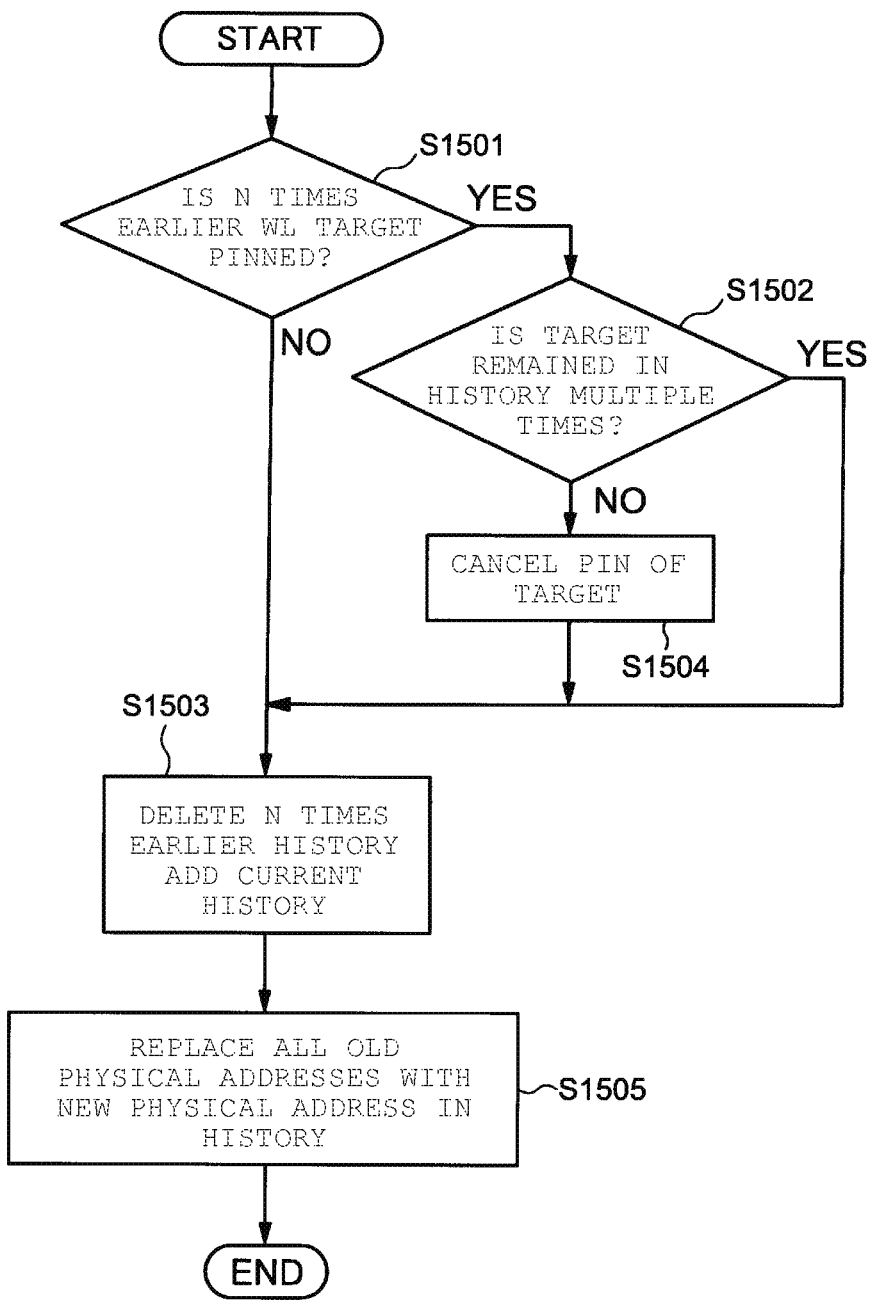
FIG. 15 is a flowchart showing an update process of a wear leveling history table of a memory system according to a modification of the second embodiment.

A modification of the second embodiment will be described with reference to FIG. 15. FIG. 15 is a flowchart illustrating an update process of the wear leveling history table of the memory system according to a modification of the second embodiment. In the above embodiment, the configuration in which the wear leveling history table 100A stores logical addresses was exemplified, but in the modification, a configuration in which the wear leveling history table 100A stores physical addresses will be described.

The flowchart shown in FIG. 15 is similar to the flowchart shown in FIG. 10, but after S1503 in FIG. 15, which is the same as S1003 in FIG. 10, the physical address is updated from the address before the wear leveling process to the address after the process (step S1505). When the wear leveling process is executed, the association between logical addresses and physical addresses is changed. Since the target of the pinning process is the data stored in the same logical address, if the logical address associated with a specific logical address is changed from the old address to a new address by the wear leveling process, the physical address stored in the wear leveling history table 100A is also updated accordingly from the old address to the new address. This modification may be applied not only to the second embodiment but also to other embodiments.

3. Third Embodiment

Figure 16:
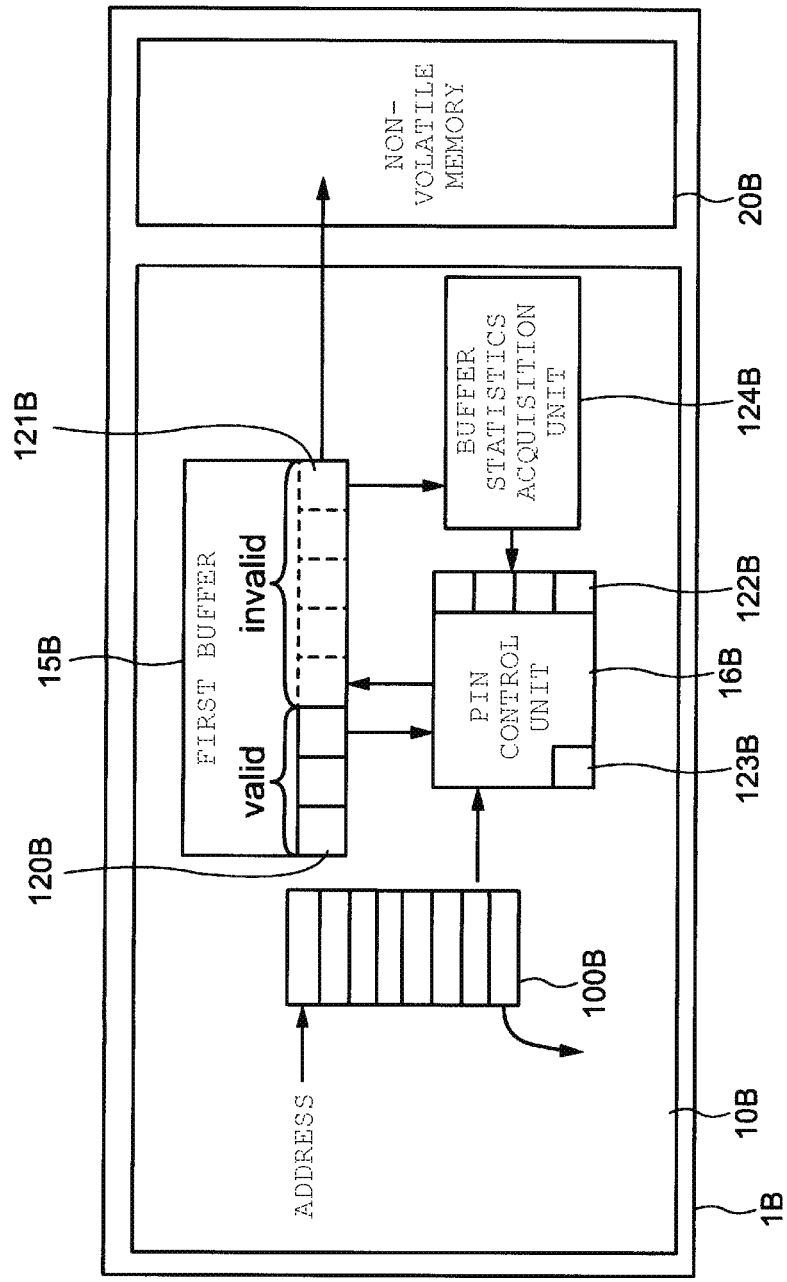
FIG. 16 is a block diagram showing a configuration of a non-volatile memory and a memory module according to a third embodiment.

A memory system 1B according to a third embodiment will be described with reference to FIGS. 16 and 17. Since the configuration of the memory system 1B according to the third embodiment is similar to the configuration of the memory system 1A according to the second embodiment (see FIG. 8), the descriptions of the common elements will be omitted and the differences will be mainly described. In the third embodiment, the memory system 1B differs from the memory system 1A in that the memory controller 10B includes a first buffer 15B, a pin control unit 16B, a wear leveling history table 100B, and a buffer statistics acquisition unit 124B. In the following description, when describing a configuration similar to that of the memory system 1A shown in FIG. 8, the letter after the reference numerals shown in FIG. 8 may be changed from "A" to "B" and the description thereof may be omitted. Similarly, when describing a configuration similar to that of the memory system 1 shown in FIG. 1, the letter "B" may be added after the reference numerals shown in FIG. 1 and the description thereof may be omitted.

[3-1. Configuration of Buffer Statistics Acquisition Unit 124B]

The buffer statistics acquisition unit 124B acquires statistical information such as the probability of using the data stored in the first buffer 15B in response to write requests and read requests from the CPU 90B. The buffer statistics acquisition unit 124B uses the acquired statistical information to determine whether to perform the unpinning process. Specifically, referring to the flowchart of FIG. 14, the statistical information acquired by the buffer statistics acquisition unit 124B may be statistical information such as the number of times it has been determined that write data exists in the first buffer 15B in response to the write request received from the CPU 90B and the probability thereof, and statistical information such as the number of times that the data has been output from the first buffer 15B and the probability thereof when the data of the read address related to the read request received from the CPU 90B exists in the first buffer 15B.

The above number may be called the "number of hits", and the above probability may be called the "hit rate". The buffer statistics acquisition unit 124B sets a threshold based on a predetermined condition based on the number of hits or the hit rate. Although the details will be described below, it is determined whether to perform the unpinning process based on the threshold value.

In particular, in the case of the present embodiment, the buffer statistics acquisition unit 124B acquires the number of hits and hit rate when it is determined that the write data is stored in the pinning area 120B of the first buffer 15B, and when the data related to the read address is output from the pinning area 120B in the first buffer 15B. However, the statistical information acquired by the buffer statistics acquisition unit 124B is not limited to the above.

The buffer statistics acquisition unit 124B can be considered as a part that implements a part of the functions of the memory controller 10B. In the following description, the function of the buffer statistics acquisition unit 124B can also be called the function of the memory controller 10B.

[3-2. Flowchart of Pinning Process]

Since the flowchart of the entire pinning process according to the present embodiment is the same as that shown in FIG. 9, the detailed description thereof will be omitted. In the present embodiment, the flowchart for an update process of the wear leveling history table is different from that shown in FIG. 10. The differences from FIG. 10 will be described in detail below.

Figure 17:
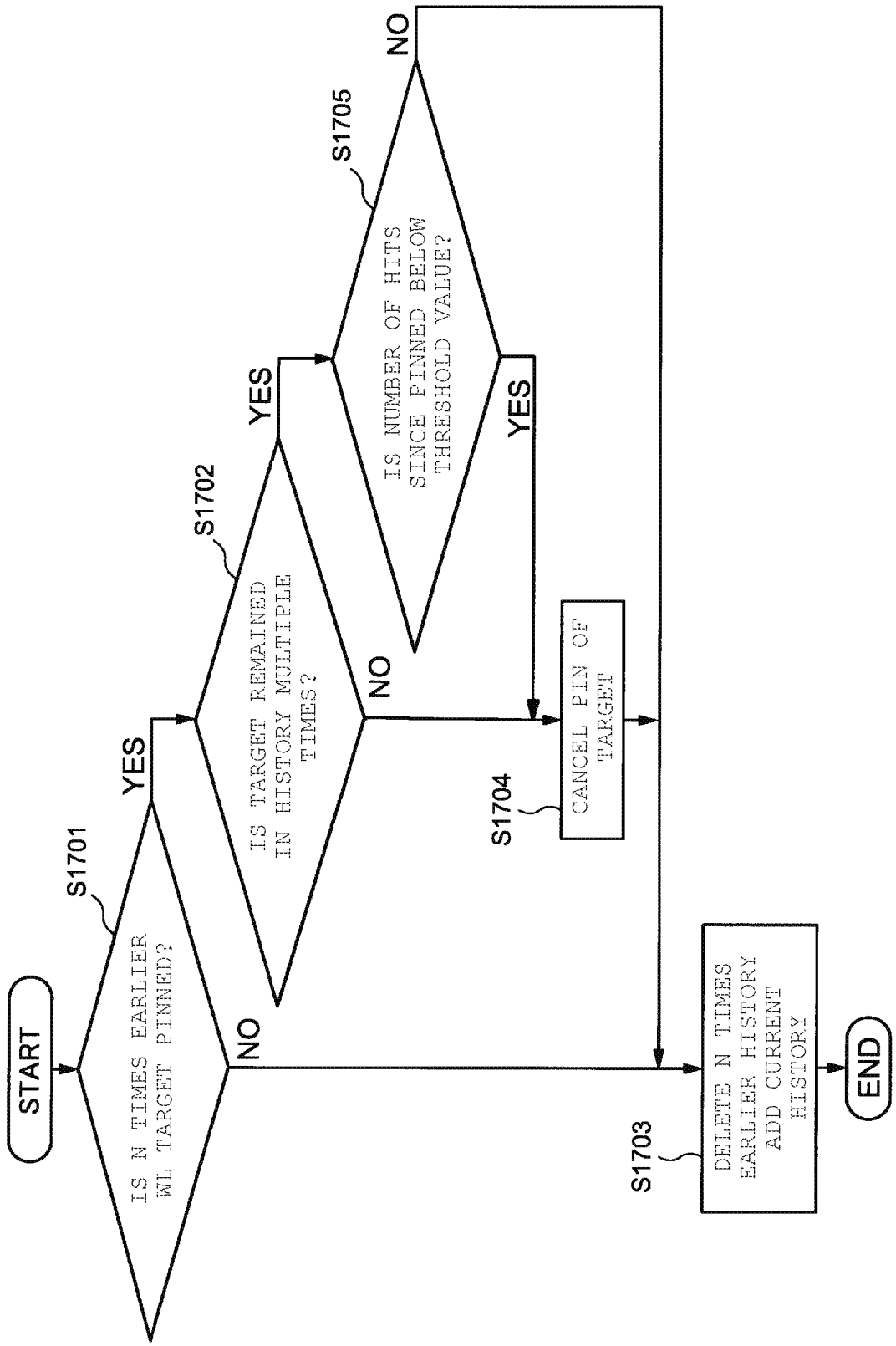
FIG. 17 is a flowchart showing an update process of a wear leveling history table of the memory system according to the third embodiment.

Of the steps shown in FIG. 17, steps S1701 to S1704 are the same as steps S1001 to S1004 shown in FIG. 10, and the descriptions thereof will be omitted. In FIG. 17, in S1702, if the logical address related to the target data exists multiple times in the wear leveling history table 100B ("YES" in S1702), a determination is made as to whether the number of hits after the pinning process is executed reaches a threshold value (step S1705).

If it is determined in S1705 that the number of hits has not reached the threshold value (below the threshold value) ("YES" in S1705), the unpinning process for the data is performed (step S1704). On the other hand, if it is determined in S1705 that the number of hits has reached the threshold value ("NO" in S1705), the logical address related to the wear leveling process N times earlier is deleted from the wear leveling history table 100B, and a logical address related to a newly executed wear leveling process is added to the wear leveling history table 100B (step S1703).

As described above, according to the memory system of the present embodiment, the same effects as those of the second embodiment can be obtained. Further, since the wear leveling history table 100B is updated based on the statistical information, it is possible to leave the information of the frequently accessed pages in the table according to the actual situation.

4. Fourth Embodiment

A memory system 1C according to a fourth embodiment will be described with reference to FIGS. 18 and 19. Since the configuration of the memory system 1C according to the fourth embodiment is similar to the configuration of the memory system 1A according to the second embodiment (see FIG. 8), the descriptions of the common elements will be omitted and the differences will be mainly described. In the fourth embodiment, the wear leveling history table 100C is different from the wear leveling history table 100A of the second embodiment in that time information related to the time when the wear leveling process was performed or the time from a certain reference time is stored in addition to the logical address of the page on which the wear leveling process was performed. In the following description, when describing a configuration similar to that of the memory system 1A shown in FIG. 8, the letter after the reference numerals shown in FIG. 8 may be changed from "A" to "C" and the description thereof may be omitted. Similarly, when describing a configuration similar to that of the memory system 1 shown in FIG. 1, the letter "C" may be added after the reference numerals shown in FIG. 1 and the description thereof may be omitted.

[4-1. Configuration of Wear Leveling History Table 100C]

Figure 18:
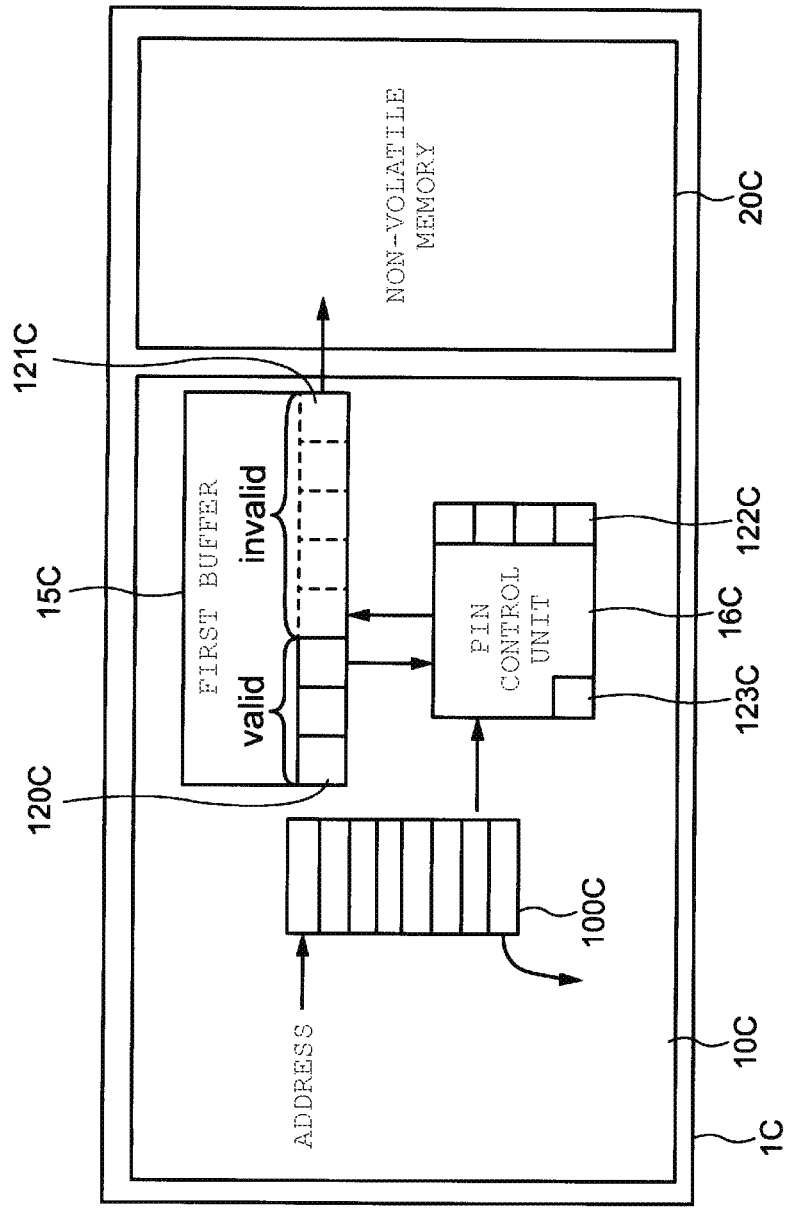
FIG. 18 is a block diagram showing a configuration of a non-volatile memory and a memory module according to a fourth embodiment.

FIG. 18 is a block diagram showing a configuration of a non-volatile memory and a memory module according to the fourth embodiment. The wear leveling history table 100C stores time information as described above. The time information may be information about the time when the wear leveling process was executed, or information about the time from when another wear leveling process was executed. The time information may be information related to the interval from when the previous wear leveling process was performed until when the current wear leveling process was performed.

The wear leveling history table 100C may include other metadata in addition to the time information. The metadata may include, for example, the number of hits or hit rate described above.

[4-2. Flowchart of Pinning Process]

Figure 19:
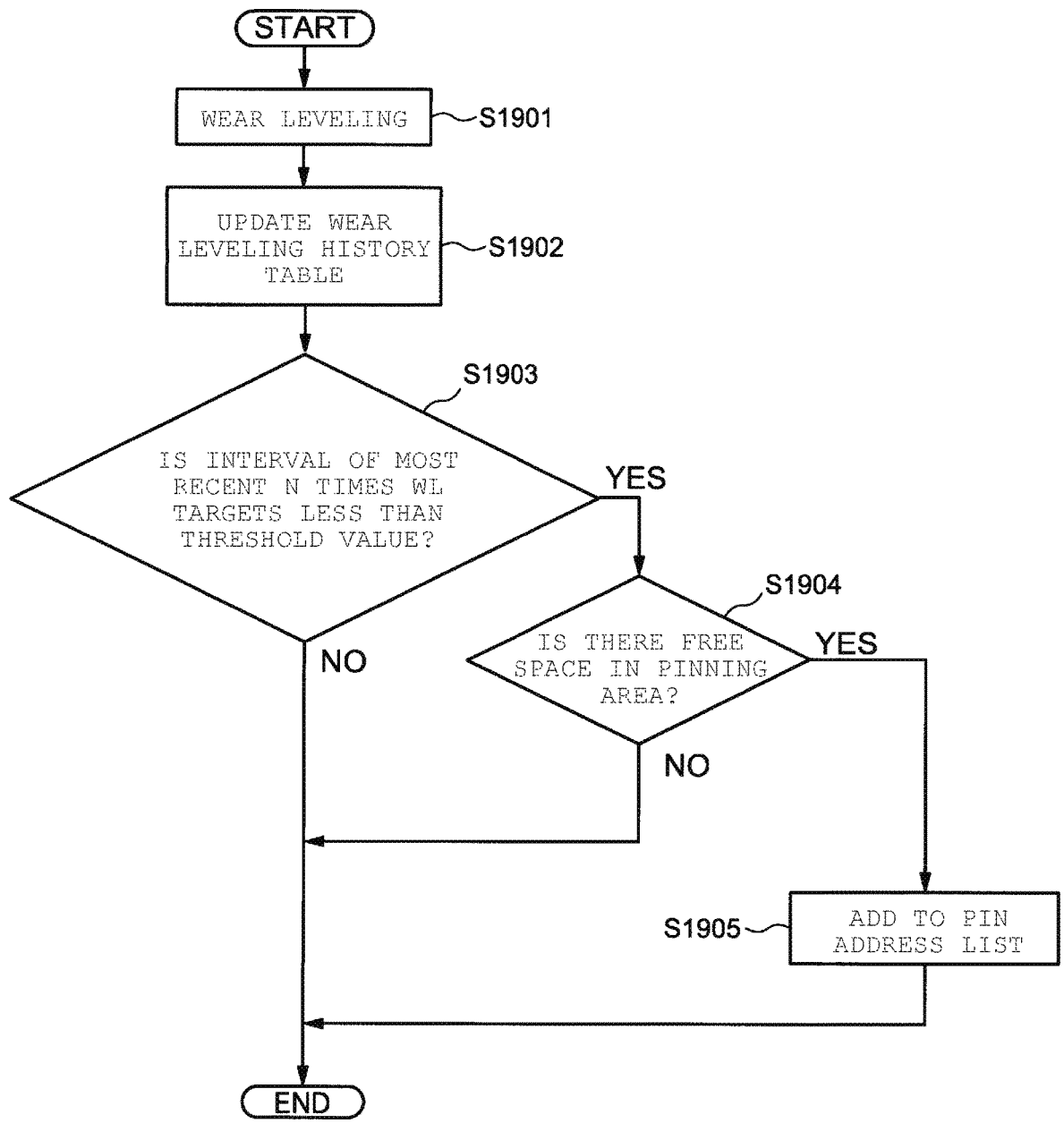
FIG. 19 is a flowchart showing a pinning process of a memory system according to the fourth embodiment.

FIG. 19 is a flowchart showing the pinning process of the memory system according to the fourth embodiment. The flowchart of FIG. 19 according to the present embodiment is similar to the flowchart of FIG. 9, but the difference is that FIG. 9 includes step S903, whereas FIG. 19 includes step S1903. Other steps S1901, S1902, S1904, and S1905 in FIG. 19 are the same as steps S901, S902, S904, and S905 shown in FIG. 9, and the description thereof is omitted.

In S1903, it is determined whether the page related to the update has been subjected to the most recent N times wear leveling processes, and the time has not reached a threshold value since the previous wear leveling process was executed (below the threshold value). In other words, in S1903, by referring to the time information added to the wear leveling history table 100C, it is determined whether it is necessary to execute the pinning process. Specifically, when the interval between the wear leveling processes is long, that is, when the time from when the previous wear leveling process was executed to when the current wear leveling process is executed reaches the threshold value, since the access frequency to the data on which the pinning process is executed is low and it is inefficient to continue the pinning process, it is determined that the page is not to be subjected to the pinning process (not added to the Pin address list 122C). On the other hand, if the time from when the previous wear leveling process was executed to when the current wear leveling process is executed is less than the threshold value, the access frequency to the pinned data is high, and there is the practical benefit of executing the pinning process. Therefore, through steps S1904 and S1905, it is determined that the page is to be subjected to the pinning process (added to the Pin address list 122C).

As described above, according to the memory system of the present embodiment, the same effects as those of the second embodiment can be obtained. In addition, since it is determined whether to execute the pinning process based on the time information, the pinning process can be executed for pages with high access frequency according to the actual situation.

5. Fifth Embodiment

A memory system 1D according to the fifth embodiment will be described with reference to FIGS. 20 to 22. Since the configuration of the memory system 1D according to the fifth embodiment is similar to the configuration of the memory system 1 according to the first embodiment (see FIG. 2), the description of the common elements will be omitted and the differences will be mainly described. In the fifth embodiment, the memory system 1D differs from the memory system 1 shown in FIG. 2 in that the first buffer 15D includes a read buffer 151D and a write buffer 152D. In the following description, when describing a configuration similar to that of the memory system 1 shown in FIG. 2, the letter "D" may be added after the reference numerals shown in FIG. 2, and the description thereof may be omitted. Similarly, when describing a configuration similar to that of the memory system 1 shown in FIG. 1, the letter "D" may be added after the reference numerals shown in FIG. 1 and the description thereof may be omitted.

[5-1. Configuration of First Buffer 15D]

Figure 20:
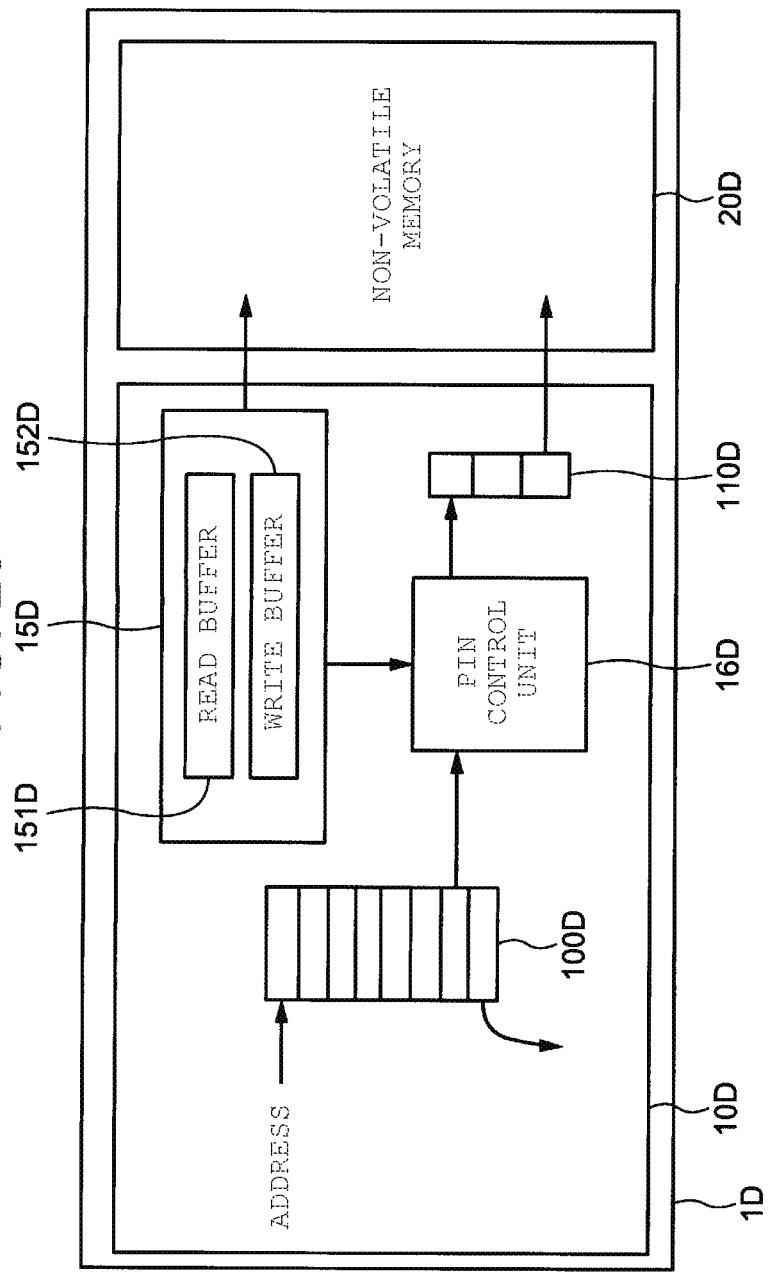
FIG. 20 is a block diagram showing a configuration of a non-volatile memory and a memory module according to a fifth embodiment.

As shown in FIG. 20, the first buffer 15D includes the read buffer 151D and the write buffer 152D. The read buffer 151D is a read operation buffer, and stores data read from the non-volatile memory 20D in response to a read request from the CPU 90D. The write buffer 152D is a buffer for a write operation, and stores write data provided in a write request from the CPU 90D and before being written to the non-volatile memory 20D.

[5-2. Flowchart of Write Operation]

Figure 21:
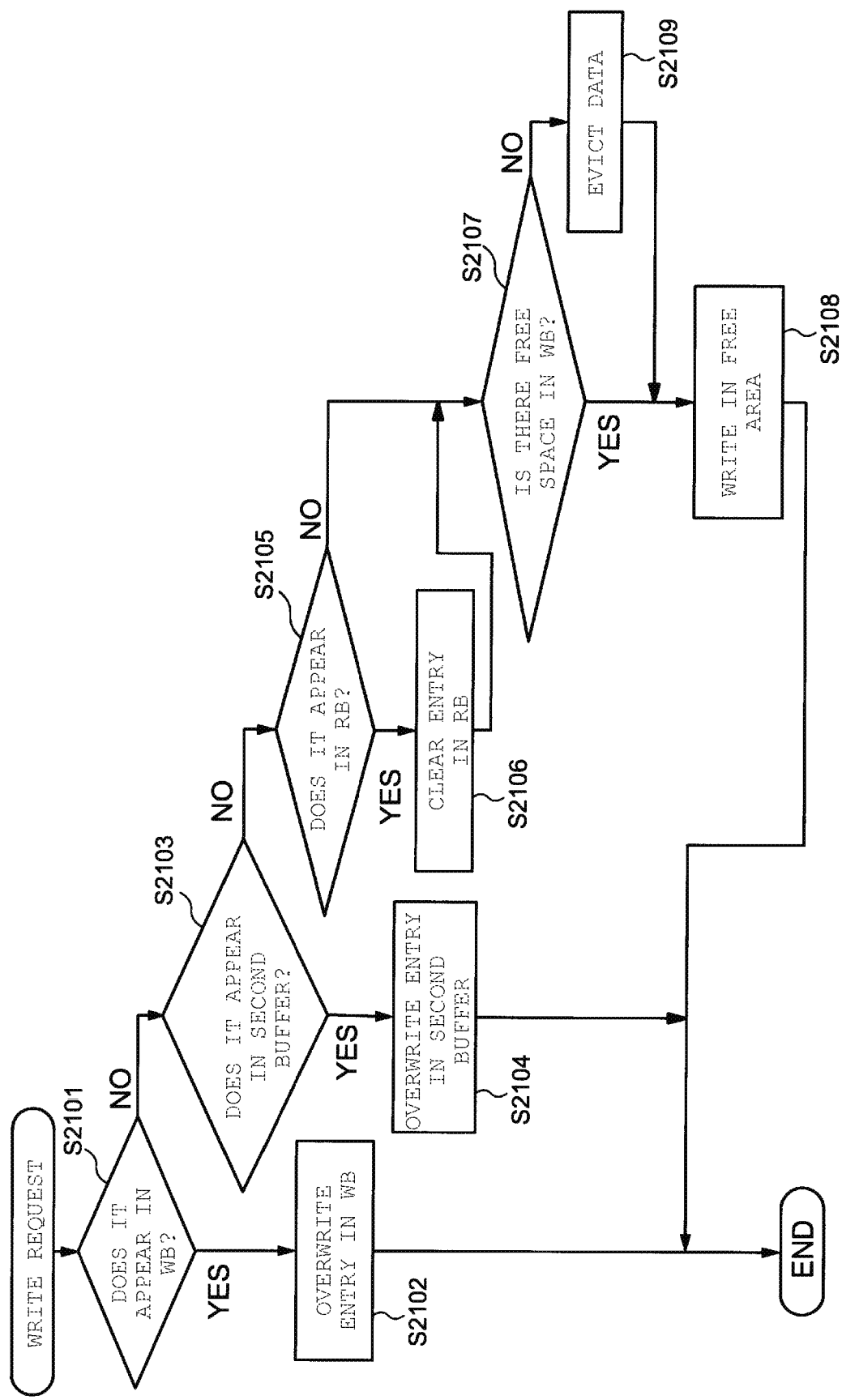
FIG. 21 is a flowchart showing a write operation of a memory system according to the fifth embodiment.

FIG. 21 is a flowchart showing a write operation of a memory system according to one embodiment. When the memory controller 10D receives a write request from the CPU 90D, it is determined whether write data related to the write request exists in the write buffer 152D (step S2101).

If it is determined in S2101 that the write data exists in the write buffer 152D ("YES" in S2101), the entry in the write buffer 152D is overwritten (step S2102). On the other hand, if it is determined in S2101 that the write data does not exist in the write buffer 152D ("NO" in S2101), it is determined whether the write data exists in the second buffer 110D (step S2103).

If it is determined in S2103 that the write data exists in the second buffer 110 ("YES" in S2103), the entry in the second buffer 110 is overwritten (step S2104). On the other hand, if it is determined in S2103 that the write data does not exist in the second buffer 110 ("NO" in S2103), it is determined whether the write data exists in the read buffer 151D (step S2105).

If it is determined in S2105 that the write data exists in the read buffer 151D ("YES" in S2105), the entry in the read buffer 151D is cleared (step S2106). After S2106, it is determined whether there is a free space in the write buffer 152D (step S2107). If it is determined in S2105 that the write data does not exist in the read buffer 151D ("NO" in S2105), the step of S2107 is also executed.

If it is determined in S2107 that there is free space in the write buffer 152D ("YES" in S2107), the write data is written in the area with a free space (step S2108). On the other hand, if it is determined in S2107 that there is no free space in the write buffer 152D ("NO" in S2107), the data in the write buffer 152D is evicted (step S2109), and the data is written in the area where a free space is generated in the write buffer 152D (S2108). "FIFO", "LFU", or "LRU" may be adopted as means to select a target of data eviction in S2109.

[5-2. Flowchart of Read Operation]

Figure 22:
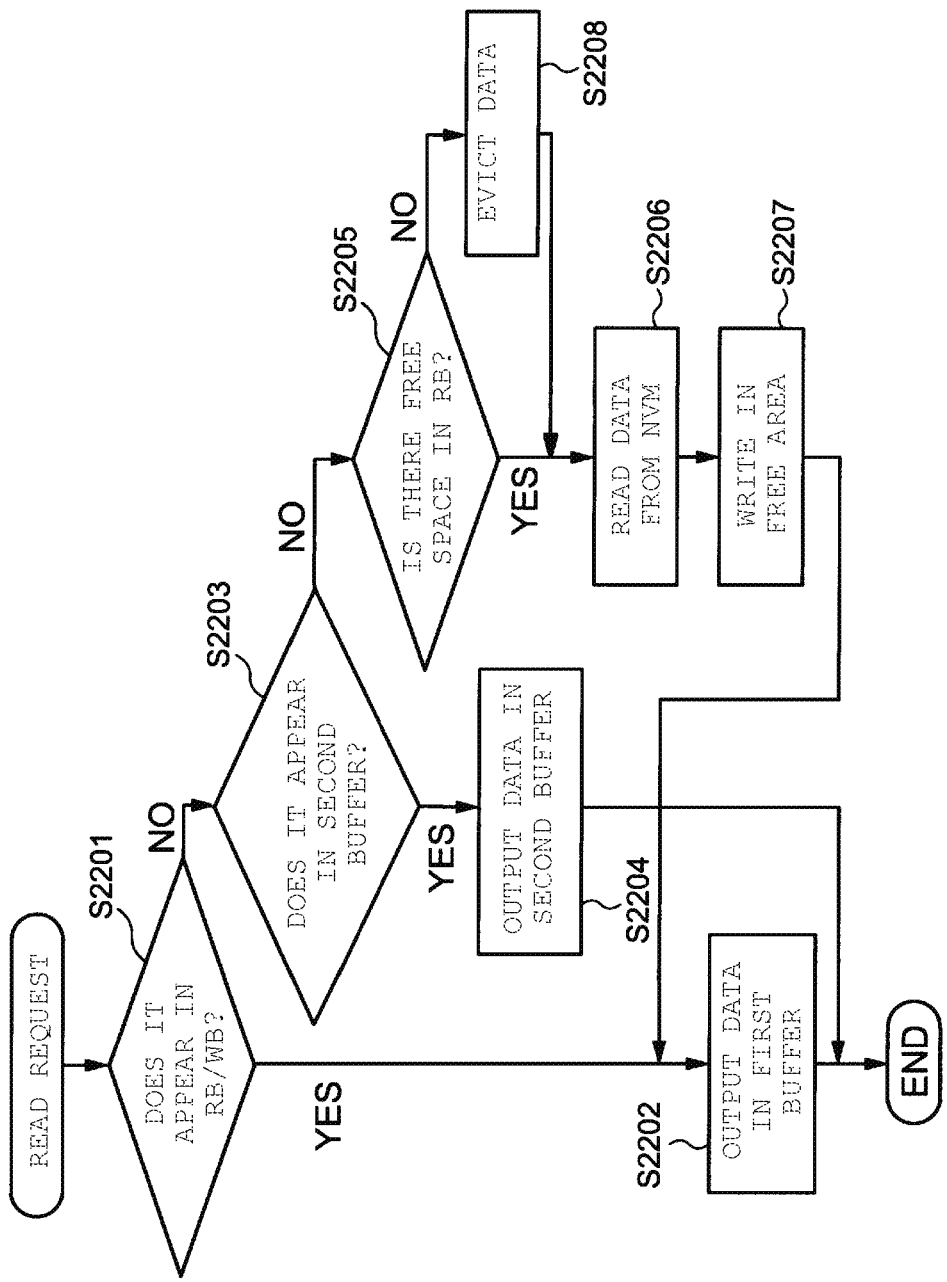
FIG. 22 is a flowchart showing a read operation of a memory system according to the fifth embodiment.

FIG. 22 is a flowchart showing a read operation of the memory system 1D according to the fifth embodiment. Upon receiving a read request from the CPU 90D, the memory controller 10D determines whether the read address data related to the read request exists in the read buffer 151D or the write buffer 152D (step S2201).

If it is determined in S2201 that the data exists in the read buffer 151D or write buffer 152D ("YES" in S2201), the data stored in the read buffer 151D or the write buffer 152D is output (step S2202). On the other hand, if it is determined in S2201 that the data exists in neither the read buffer 151D nor the write buffer 152D ("NO" in S2201), it is determined whether the data exists in the second buffer 110D (step S2203).

If it is determined in S2203 that the data exists in the second buffer 110D ("YES" in S2203), the data stored in the second buffer 110D is output (step S2204). On the other hand, if it is determined in S2203 that the data does not exist in the second buffer 110D ("NO" in S2203), it is determined whether there is a free space in the read buffer 151D (step S2205).

If it is determined in S2205 that there is a free space in the read buffer 151D ("YES" in S2205), the data is read from the non-volatile memory 20D (step S2206) and the read data is written in a certain area with a free space (step S2207). On the other hand, if it is determined in S2205 that there is no free space in the read buffer 151D ("NO" in S2205), the data in the read buffer 151D is evicted (step S2208), and the data read from the non-volatile memory is written in the area in which a free space is generated in the read buffer 151D (S2206, S2207), and then, the data output of S2202 is executed.

6. Sixth Embodiment

A memory system 1E according to a sixth embodiment will be described with reference to FIGS. 23 to 24. Since the configuration of the memory system 1E according to the sixth embodiment is similar to the configuration of the memory system 1A according to the second embodiment, the descriptions of common elements will be omitted, and differences will be mainly described. Since the configuration of the sixth embodiment is the same as the configurations shown in FIGS. 1 and 8, the illustration thereof will be omitted. When describing the configuration of the memory system 1E of the sixth embodiment, the description will be made with reference to FIG. 8, replacing the letters "A" to "E" after the reference numerals written for the configuration shown in FIG. 8. Similarly, when describing a configuration similar to that of the memory system 1 shown in FIG. 1, the letter "E" may be added to the reference numerals shown in FIG. 1, and the description thereof may be omitted. The wear leveling process in the present embodiment is executed with a read operation as a trigger.

[6-1. Flowchart of Pinning Process]

Figure 23:
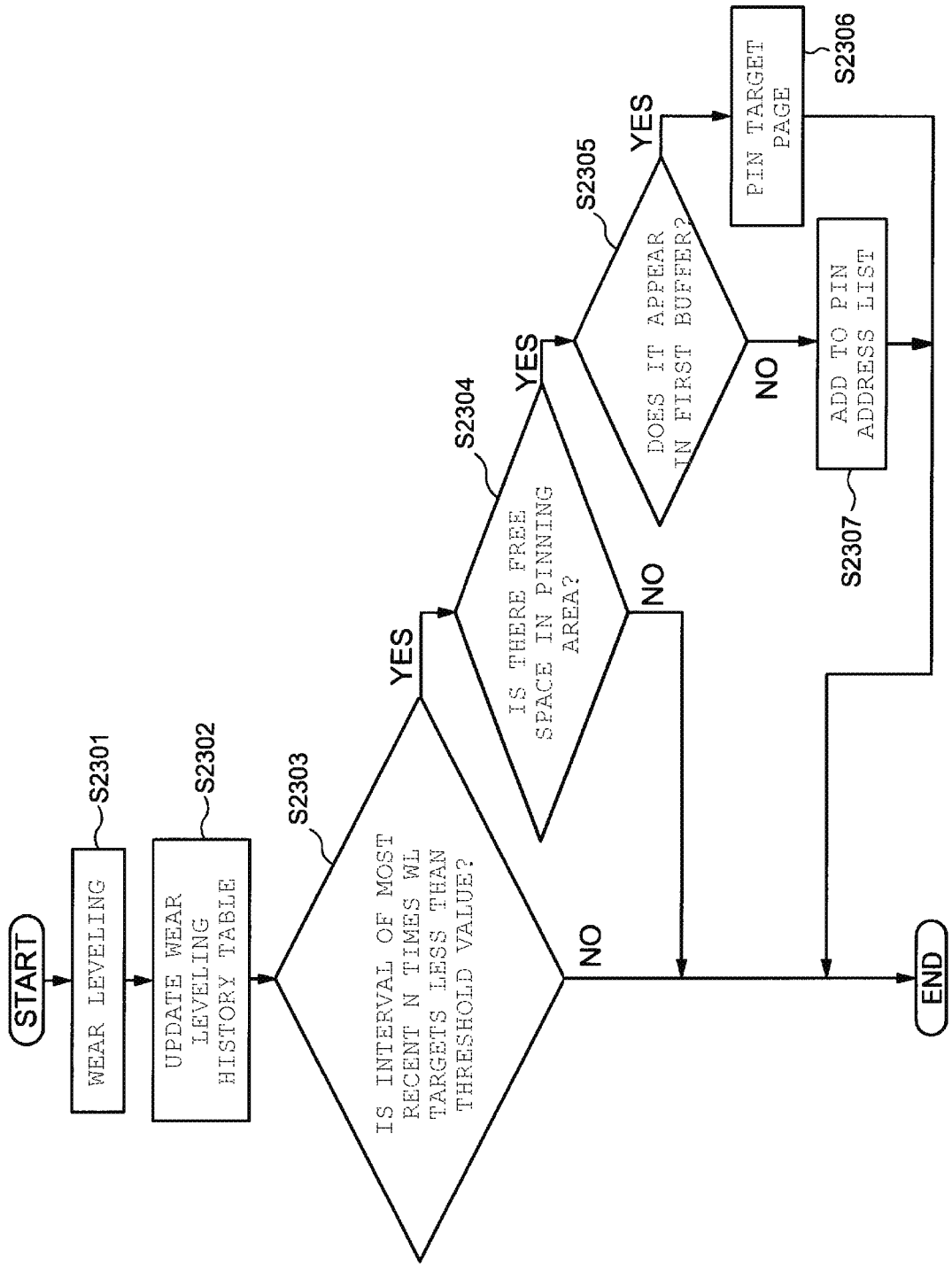
FIG. 23 is a flowchart showing a pinning process of a memory system according to a sixth embodiment.

FIG. 23 is a flowchart showing the pinning process of the memory system 1E according to the sixth embodiment. The flowchart of FIG. 23 according to the present embodiment is similar to the flowchart of FIG. 9, but in FIG. 23, after S2304 corresponding to S904 of FIG. 9, it is determined whether the data related to the logical address of the target page exists in the first buffer 15E (step S2305). If it is determined that the data exists in the first buffer 15E ("YES" in S2305), the pinning process is executed on the target page (step S2306). On the other hand, if it is determined that the data does not exist in the first buffer 15E ("NO" in S2305), the logical address of the page on which the wear leveling process has been executed is added to the Pin address list 122E (step S2307).

[6-2. Flowchart of Write Operation]

The flowchart of the write operation of the sixth embodiment is the same as the flowchart of FIG. 14.

[6-3. Flowchart of Read Operation]

Figure 24:
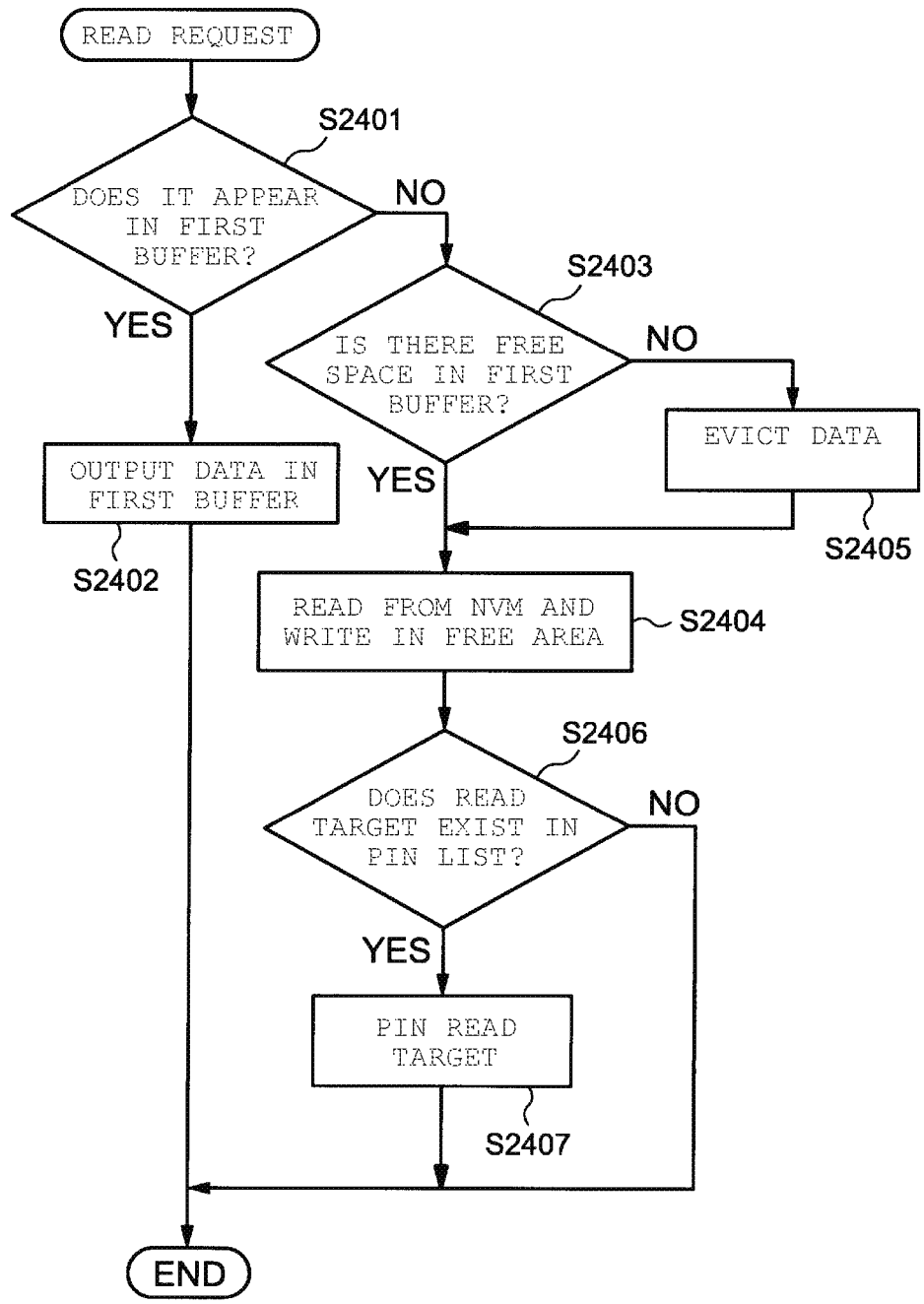
FIG. 24 is a flowchart showing a read operation of a memory system according to the sixth embodiment.

FIG. 24 is a flowchart showing a read operation of the memory system 1E according to the sixth embodiment. Upon receiving a read request from the CPU 90E, the memory controller 10E determines whether the read address data related to the read request exists in the first buffer 15E (step S2401).

If it is determined in S2401 that the data exists in the first buffer 15E ("YES" in S2401), the data stored in the first buffer 15E is output (step S2402), and the flow shown in FIG. 24 ends. On the other hand, if it is determined in S2401 that the data does not exist in the first buffer 15E ("NO" in S2401), it is determined whether there is a free space in the first buffer 15E (step S2403).

In S2403, if it is determined that there is a free space in the first buffer 15E ("YES" in S2403), the target read data is read from the non-volatile memory 20E and written to the area with a free space (step S2404). On the other hand, if it is determined in S2403 that there is no free space in the first buffer 15E ("NO" in S2403), the data in the first buffer 15E is evicted (step S2405), and the read data read out from the non-volatile memory 20E is written in the area where the free space has been generated in the first buffer 15E (S2404). "FIFO", "LFU", or "LRU" may be adopted as means to select a target of data eviction in S2405.

When the write of the read data is completed in S2404, it is determined whether the logical address of the page corresponding to the read data is stored in the Pin address list 122E (step S2406). In S2406, if the logical address is stored in the Pin address list 122E ("YES" in S2406), the pinning process is executed on the page data corresponding to the logical address (step S2407). On the other hand, if it is determined in S2406 that the logical address is not stored in the Pin address list 122E ("NO" in S2406), the flow shown in FIG. 24 ends.

Although the present disclosure has been described with reference to the drawings, the present disclosure is not limited to the above embodiments and may be modified as appropriate without departing from the scope of the present disclosure. For example, based on the pin control unit of the present embodiment, additions, deletions, or design changes of the configuration elements made by those skilled in the art as appropriate are also provided in the scope of the present disclosure as long as they have the gist of the present disclosure. Furthermore, the embodiments described above may be appropriately combined as long as there is no contradiction, and technical matters common to each embodiment are provided in each embodiment without explicit description.

Even if there are other effects that are different from the effects brought about by the aspects of each embodiment described above, it is understood that those that are obvious from the description of this specification or those that can be easily predicted by those skilled in the art are provided by the present disclosure.

While certain embodiments have been described, these embodiments have been presented by way of example only, and are not intended to limit the scope of the disclosure. Indeed, the novel embodiments described herein may be embodied in a variety of other forms; furthermore, various omissions, substitutions, and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A memory system comprising:
a non-volatile memory; and
a controller including a memory having a lower access latency than the non-volatile memory, the controller configured to:
temporarily store, in the memory, data to be written into the non-volatile memory and data read from the non-volatile memory;
track logical addresses of data stored in the non-volatile memory that were subject to a first limited number of recent wear leveling processes, in a ring buffer configured in the memory of the controller;
perform a current wear leveling process on first data stored in the non-volatile memory, and determine whether an logical address of the first data subject to the current wear leveling process is included in the tracked logical addresses and whether the first data is stored in the memory; and
upon determining that the logical address of the first data is included in the tracked logical addresses and that the first data is stored in the memory, perform a pinning process to disable overwrite of the first data stored in the memory.

2. The memory system according to claim 1, wherein
the memory includes a first memory for unpinned data and a second memory for pinned data, and
the controller is configured to store the first data subject to the current wear leveling process in the first memory until the pinning process, and transfer the data from the first memory to the second memory during the pinning process.

3. The memory system according to claim 2, wherein the controller is configured to enable overwrite of the unpinned data in the first memory.

4. The memory system according to claim 1, wherein the controller is configured to:
maintain an address list of logical addresses of data that are to be subjected to pinning processes; and
add the logical address of the first data subject to the current wear leveling process to the address list.

5. The memory system according to claim 4, wherein the controller is configured to:
upon determining that the first data subjected to the current wear leveling process is not stored in the memory, add the logical address of the first data subject to the current wear leveling process to the address list.

6. The memory system according to claim 4, wherein the controller is configured to add the logical address of the first data subject to the current wear leveling process to the address list in response to determining that a time period from a most recent one of the first limited number of recent wear leveling processes to the current wear leveling process is less than a threshold.

7. The memory system according to claim 4, wherein the controller is configured to:
perform another wear leveling process on second data stored in the non-volatile memory and the memory after the current wear leveling process, and determine that a logical address of the second data subject to the another wear leveling process is not included in the tracked logical addresses; and perform an unpinning process to enable overwrite of the second data subject to the another wear leveling process.

8. The memory system according to claim 1, wherein the controller is configured to:
maintain an address list of logical addresses of data that are to be subjected to pinning processes.

9. The memory system according to claim 8, wherein the controller is configured to perform an unpinning process to enable overwrite of the first data in the memory subjected to the current pinning process based on an access frequency thereof.

10. A method of controlling a memory system including a non-volatile memory and a memory having a lower access latency than the non-volatile memory, the method comprising:
temporarily storing, in the memory, data to be written into the non-volatile memory and data read from the non-volatile memory;
tracking logical addresses of data stored in the non-volatile memory that were subject to a first limited number of recent wear leveling processes, in a ring buffer configured in the memory;
performing a current wear leveling process on first data stored in the non-volatile memory, and determining whether an logical address of the first data subject to the current wear leveling process is included in the tracked logical addresses and whether the first data is stored in the memory; and
upon determining that the logical address of the first data is included in the tracked logical addresses and the first data is stored in the memory, performing a pinning process to disable overwrite of the first data stored in the memory.

11. The method according to claim 10, wherein
the memory includes a first memory for unpinned data and a second memory for pinned data, and
the method further comprises storing the first data subject to the current wear leveling process in the first memory until the pinning process, and transferring the data from the first memory to the second memory during the pinning process.

12. The method according to claim 11, further comprising:
enabling overwrite of the unpinned data in the first memory.

13. The method according to claim 10, further comprising:
maintaining an address list of logical addresses of data that are to be subjected to pinning processes; and
adding the logical address of the first data subject to the current wear leveling process to the address list.

14. The method according to claim 13, further comprising:
upon determining that the first data subjected to the current wear leveling process is not stored in the memory, adding the logical address of the first data subject to the current wear leveling process to the address list.

15. The method according to claim 13, further comprising:
adding the logical address of the first data subject to the current wear leveling process to the address list in response to determining that a time period from a most recent one of the first limited number of recent wear leveling processes to the current wear leveling process is less than a threshold.

16. The method according to claim 13, further comprising:
performing another wear leveling process on second data stored in the non-volatile memory and the memory after the current wear leveling process, and determining that a logical address of the second data subject to the another wear leveling process is not included in the tracked logical addresses; and
performing an unpinning process to enable overwrite of the second data subject to the another wear leveling process.

17. The method according to claim 10, further comprising:
maintaining an logical address list of addresses of data that are to be subjected to pinning process.

18. The method according to claim 17, further comprising:
performing an unpinning process to enable overwrite of the first data in the memory subjected to the current pinning process based on an access frequency thereof.

* * * * *